US012729088B2

(12) United States Patent
Kitajima

(10) Patent No.: US 12,729,088 B2
(45) Date of Patent: Sep. 8, 2026

(54) IMAGE FORMING SYSTEM FOR CONTROLLING DISCHARGE OF SHEET ON WHICH IMAGE HAS BEEN INSPECTED

(71) Applicant: CANON KABUSHIKI KAISHA, Tokyo (JP)

(72) Inventor: Keisuke Kitajima, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 173 days.

(21) Appl. No.: 18/756,024

(22) Filed: Jun. 27, 2024

(65) Prior Publication Data

US 2024/0351817 A1 Oct. 24, 2024

Related U.S. Application Data

(63) Continuation of application No. PCT/JP2022/047078, filed on Dec. 21, 2022.

(30) Foreign Application Priority Data

Jan. 19, 2022 (JP) ................................ 2022-006570
Nov. 28, 2022 (JP) ................................ 2022-189534

(51) Int. Cl.
*B65H 31/24* (2006.01)
*B65H 29/62* (2006.01)
(Continued)

(52) U.S. Cl.
CPC ............. *B65H 29/62* (2013.01); *B65H 43/02* (2013.01); *G03G 15/5016* (2013.01);
(Continued)

(58) Field of Classification Search
CPC .... B65H 29/62; B65H 43/02; B65H 2511/11; B65H 2551/21; B65H 2301/542;
(Continued)

(56) References Cited

U.S. PATENT DOCUMENTS 6,385,433 B1 5/2002 Sawada
8,000,618 B2 8/2011 Yokomizo
(Continued)

FOREIGN PATENT DOCUMENTS

CN 108459474 A 8/2018
CN 110549733 A 12/2019
(Continued)

OTHER PUBLICATIONS

Office Action dated Jul. 18, 2025, in Korean Patent Application No. 10-2024-7026661.
(Continued)

*Primary Examiner* — Luan K Bui
(74) *Attorney, Agent, or Firm* — Venable LLP

(57) ABSTRACT

A length, in a lengthwise direction, of a sheet to be inspected by an inspection unit may be longer than a length of a conveyance path between a branch position corresponding to an initial branch path in a plurality of branch paths and a reading position of a reading apparatus. The sheet inspected by the inspection unit is not discharged to a stacking unit corresponding to the initial branch path, and is discharged to a stacking unit corresponding to a branch path branching from a main path at a branch position located further downstream than a branch position corresponding to the initial branch path.

28 Claims, 13 Drawing Sheets

(51) Int. Cl.
*B65H 43/02* (2006.01)
*G03G 15/00* (2006.01)

(52) U.S. Cl.
CPC ..... *G03G 15/6552* (2013.01); *G03G 15/6588* (2013.01); *B65H 2511/11* (2013.01); *B65H 2551/21* (2013.01); *G03G 2215/00734* (2013.01)

(58) Field of Classification Search
CPC .... B65H 2513/42; B65H 29/60; B65H 31/24; B65H 43/04; B65H 2515/84; B65H 2551/26; B65H 2553/42; B65H 2701/11312; B65H 2801/06; B65H 2801/03; B65H 2220/01; B65H 2220/02; B65H 2220/03; G03G 15/5016; G03G 15/6552; G03G 15/6588; G03G 2215/00734; G03G 21/00; G03G 21/14; G03G 15/6573; G03G 15/5062; B41J 29/38; B41J 29/393; B41J 29/42; H04N 1/00
USPC ......................................................... 270/1.01
See application file for complete search history.

(56) References Cited

U.S. PATENT DOCUMENTS

| | | | | |
|---|---|---|---|---|
| 9,551,966 | B2 | 1/2017 | Hirota et al. | |
| 10,618,759 | B2 * | 4/2020 | Anezaki | B65H 9/002 |
| 11,090,954 | B2 | 8/2021 | Emoto et al. | |
| 11,394,840 | B2 | 7/2022 | Ito | |
| 11,409,215 | B2 | 8/2022 | Yoshida et al. | |
| 11,973,909 | B2 | 4/2024 | Ito | |
| 12,098,043 | B2 * | 9/2024 | Saito | G03G 15/6552 |
| 2009/0245589 | A1 * | 10/2009 | Komoto | B41J 13/10 382/112 |
| 2011/0211011 | A1 * | 9/2011 | Hoshi | B41J 29/393 347/19 |
| 2015/0168906 | A1 | 6/2015 | Ishii | |
| 2018/0239289 | A1 | 8/2018 | Takada | |
| 2019/0025736 | A1 * | 1/2019 | Ishiguro | G03G 15/5083 |
| 2020/0371466 | A1 * | 11/2020 | Izumichi | B65H 29/62 |
| 2022/0234850 | A1 * | 7/2022 | Tokuma | B65H 5/062 |

FOREIGN PATENT DOCUMENTS

| | | | |
|---|---|---|---|
| JP | H11-321037 | A | 11/1999 |
| JP | 2000-202369 | A | 7/2000 |
| JP | 2007-083460 | A | 4/2007 |
| JP | 2011-145569 | A | 7/2011 |
| JP | 2013-146898 | A | 8/2013 |
| JP | 2014-137512 | A | 7/2014 |
| JP | 2015-152682 | A | 8/2015 |
| JP | 2018-126868 | A | 8/2018 |
| JP | 2019-084730 | A | 6/2019 |
| JP | 2019-095538 | A | 6/2019 |
| JP | 6693434 | B2 | 5/2020 |
| JP | 2021-165020 | A | 10/2021 |
| KR | 2001-0067127 | A | 7/2001 |
| KR | 2008-0071948 | A | 8/2008 |
| KR | 2013-0101130 | A | 9/2013 |
| KR | 2015-0070953 | A | 6/2015 |
| KR | 2021-0027124 | A | 3/2021 |
| WO | 2023/140025 | A1 | 7/2023 |

OTHER PUBLICATIONS

Search Report dated Nov. 11, 2025, in European Patent Application No. 22922175.9.
Search Report dated Jan. 19, 2022, in International Patent Application No. PCT/JP2022/047078.
Office Action dated May 23, 2026, in Korean Patent Application No. 10-2024-7026661.
Office Action dated Jun. 8, 2026, in Chinese Patent Application No. 202280089055.7.

* cited by examiner

IMAGE FORMING SYSTEM FOR CONTROLLING DISCHARGE OF SHEET ON WHICH IMAGE HAS BEEN INSPECTED

CROSS-REFERENCE TO RELATED APPLICATIONS

This application is a Continuation of International Patent Application No. PCT/JP2022/047078, filed Dec. 21, 2022, which claims the benefit of Japanese Patent Application No. 2022-006570, filed Jan. 19, 2022, and Japanese Patent Application No. 2022-189534, filed Nov. 28, 2022, all of which are hereby incorporated by reference herein in their entirety.

BACKGROUND OF THE INVENTION

Field of the Invention

The present invention relates to an image forming system for controlling the discharge of sheets on which images have been inspected.

Background Art

An image forming system has been proposed which inspects whether an image printed on a printing medium (a sheet) meets a quality standard and changes the discharge destination of the printing medium in accordance with the result of the inspection (PTL 1 and 2). Such an image forming system includes an image forming apparatus, an inspection apparatus, and one or more discharge apparatuses. The discharge apparatus includes a discharge tray to which printing media that meet the quality standard are discharged, a discharge tray to which printing media that do not meet the quality standard are discharged, and a mechanism for sorting the printing media among the trays (called a "branching mechanism").

CITATION LIST

Patent Literature

PTL 1: Japanese Patent Laid-Open No. 2014-137512
PTL 2: Japanese Patent Laid-Open No. 2021-165020

With the past technique, the user was not able to freely select the discharge tray to which the inspected printing medium is to be discharged. It would therefore be convenient for the user to be able to freely select the discharge tray. However, when a configuration in which the user can freely select the discharge tray is applied, the following problem may arise. If the length of the printing medium in a conveyance direction (a lengthwise direction) is longer than the conveyance distance from a reading position at which a reading sensor reads the image formed on the printing medium to a branch position where the conveyance path branches, the printing medium will reach the branch position while the printing medium is being inspected. There is thus a risk that the printing medium will not be able to be sorted according to the inspection result.

In light of the foregoing problem, an object of the present invention is to appropriately discharge an inspected sheet.

SUMMARY OF INVENTION

The present invention provides, for example, an image forming system including: an image forming apparatus that forms an image on a sheet; a reading apparatus that reads the image on the sheet conveyed from the image forming apparatus; an inspection unit that inspects the image on the sheet based on a result of the reading apparatus reading the image on the sheet; a conveyance path including a main path that guides the sheet read by the reading apparatus and a plurality of branch paths that branch from the main path and guide the sheet, each of the plurality of branch paths branching from the main path at a branch position corresponding to the branch path; and a plurality of stacking units on which discharged sheets are stacked, wherein each of the plurality of stacking units corresponds to a specific different branch path among the plurality of branch paths, and each of the plurality of branch paths guides the sheet toward a specific stacking unit corresponding to the branch path, when a length, in a lengthwise direction, of the sheet to be inspected by the inspection unit is longer than a length of a conveyance path between a branch position corresponding to an initial branch path in the plurality of branch paths and a reading position of the reading apparatus, the sheet inspected by the inspection unit is not discharged to a stacking unit corresponding to the initial branch path, and is discharged to a stacking unit corresponding to a branch path branching from the main path at a branch position located further downstream than the branch position corresponding to the initial branch path, and the branch position corresponding to the initial branch path is a branch position, among the branch positions corresponding respectively to the plurality of branch paths, for which a length of a conveyance path from the reading position is shortest.

Further features of the present invention will become apparent from the following description of exemplary embodiments with reference to the attached drawings.

DESCRIPTION OF EMBODIMENTS

Figure 1:
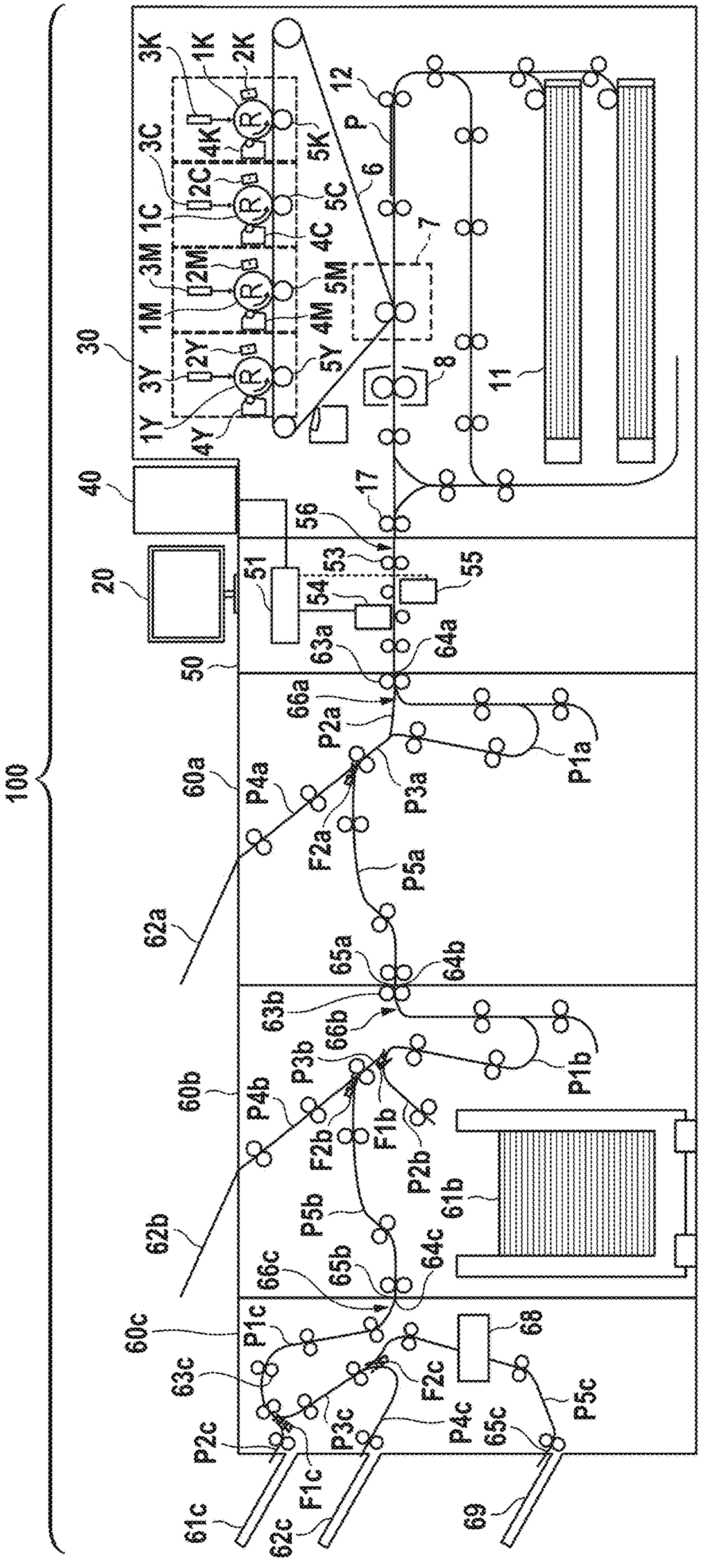
FIG. 1 is a diagram illustrating an image forming system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<System Configuration>

As illustrated in FIG. 1, an image inspection system 100 includes an operation unit 20, an image forming apparatus 30, a control apparatus 40, an inspection apparatus 50, and stacking apparatuses 60*a*, 60*b*, and 60*c*. The image forming apparatus 30, the inspection apparatus 50, and the stacking apparatuses 60*a*, 60*b*, and 60*c* have separate housings. It is sufficient for the number of the stacking apparatuses 60 to be at least one. The image inspection system 100 may be called an "image forming system". In this example, the stacking apparatuses 60*a* and 60*b* may be called "sheet stackers" or "sheet conveyance apparatuses". The stacking apparatus 60*c* may be called a "post-processing apparatus" or "finisher" having functions for post-processing. Although constituent elements that are the same as or similar to each other are given the same reference signs, the lowercase letters at the ends may be omitted when describing matters common to those elements.

The operation unit 20 includes a display device that outputs information to a user and an input device that accepts instructions from the user (e.g., a touch panel sensor).

The image forming apparatus 30 forms a toner image on a sheet Pin accordance with Y, M, C, and K color signals supplied from the control apparatus 40. The letters Y, M, C, and K appended to the reference signs indicate the toner colors yellow, magenta, cyan, and black, respectively. When matters common to all four colors are described, the letters Y, M, C, and K will be omitted from the reference signs.

A photosensitive member 1 is an image carrier that carries an electrostatic latent image and a toner image. A charger 2 uniformly charges the surface of the photosensitive member 1. An exposure device 3 forms an electrostatic latent image by irradiating the photosensitive member 1Y with a laser beam according to the color signal supplied from the control apparatus 40. A developer 4 uses toner to develop the electrostatic latent image and forms a toner image. A primary transfer roller 5Y transfers the toner image from the photosensitive member 1 to an intermediate transfer belt 6. Here, Y, M, C, and K toner images are superimposed to form a color image. The intermediate transfer belt 6 conveys the toner image to a secondary transfer section 7.

A sheet cassette 11 is a holding unit that holds a large number of sheets P. A conveyance roller 12 feeds a sheet P held in the sheet cassette 11 and conveys the sheet P along a conveyance path.

The secondary transfer section 7 transfers the toner image from the intermediate transfer belt 6 to the sheet P. A fixer 8 fixes the toner image onto the sheet P by applying heat and pressure to the sheet P and the toner image. A discharge roller 17 discharges the sheet P to the inspection apparatus 50.

The inspection apparatus 50, implemented as a reading apparatus, is an apparatus that reads an image formed on a sheet P and inspects the quality of the image. In other words, the inspection apparatus 50 is an apparatus that inspects whether the image formed on the sheet P satisfies an inspection standard. The sheet P on which the image is formed is sometimes called a "printed product".

The image on the sheet P being conveyed by conveyance rollers 53 is read at a reading position by image sensors 54 and 55. The image sensors 54 and 55 include a light source that illuminates the sheet P and a CMOS sensor.

The sheet P from which the image has been read is discharged to the stacking apparatuses 60. Note that for a sheet P which is determined to be a "no go" (i.e., does not satisfy the inspection standard; this may also be called "failing") by the inspection apparatus 50, the control apparatus 40 controls the image forming apparatus 30 to form the same image on a new sheet P. An inlet of the inspection apparatus 50 is provided with a sheet sensor 56 that detects the sheet P.

The stacking apparatus 60*a* receives the sheet P discharged from the inspection apparatus 50 through an inlet 64*a*, and discharges the sheet P to a sheet tray 62*a* serving as a stacking unit, discharges the sheet P from an outlet 65*a*, or the like. A sheet sensor 66*a* that detects the sheet P is provided at the inlet 64*a*.

A branch between a conveyance path P1*a* and a conveyance path P2*a* is located downstream from the inlet 64*a*. A flapper (not shown) is disposed at the branch, and guides the sheet P to either the conveyance path P1*a* or the conveyance path P2*a*. The conveyance paths P1*a* and P2*a* are each connected to a conveyance path P3*a*.

The conveyance path P3*a* branches to a conveyance path P4*a* and a conveyance path P5*a* at a branch position where a flapper F2*a* is installed. The sheet P that has been conveyed by the conveyance path P3*a* is guided to the conveyance path P4*a* or the conveyance path P5*a* by the flapper F2*a*.

The sheet tray 62*a* is provided at an outlet of the conveyance path P4*a*. For example, a sheet P having an image quality determined to have failed by the inspection apparatus 50 may be stacked on the sheet tray 62*a*. However, a sheet P having an image quality determined to have failed may be discharged to an apparatus downstream of the outlet 65*a*. A sheet P determined to be "OK" (i.e., satisfies the inspection standard; this may also be called "passing") may be stacked onto (discharged to) the sheet tray 62*a*. The conveyance path P5*a* extends to the outlet 65*a*.

The stacking apparatus 60*b* receives the sheet P discharged from the stacking apparatus 60*a* through an inlet 64*b*, and stacks (discharges) the sheet P onto sheet trays 61*b* and 62*b* serving as stacking units, discharges the sheet P from an outlet 65*b*, or the like. A sheet sensor 66*b* that detects the sheet P is provided at the inlet 64*b*.

A conveyance path P1*b* extending from the inlet 64*b* branches to a conveyance path P2*b* and a conveyance path P3*b* at a branch position where a flapper F1*b* is installed. The sheet P that has been conveyed through the conveyance path P1*b* is guided to the conveyance path P2*b* or the conveyance path P3*b* by the flapper F1*b*. The sheet tray 61*b* is provided at an outlet of the conveyance path P2*b*. The sheet tray 61*b* is a large-capacity sheet stacking unit on which a large number of sheets P can be stacked. For example, a sheet P which has passed the image inspection (quality inspection) may be stacked on the sheet tray 61*b*.

The conveyance path P3*b* branches to a conveyance path P4*b* and a conveyance path P5*b* at a branch position where a flapper F2*b* is installed. The sheet P that has been conveyed through the conveyance path P3*b* is guided to the conveyance path P4*b* or the conveyance path P5*b* by the flapper F2*b*.

The sheet tray 62*b* is provided at an outlet of the conveyance path P4*b*. For example, a sheet P having an image quality determined to have failed by the inspection apparatus 50 may be stacked on the sheet tray 62*b*. However, a sheet P having an image quality determined to have failed may be discharged to an apparatus downstream of the outlet 65*b*. A sheet P determined to be "OK" (i.e., satisfies the inspection standard; this may also be called "passing") may be stacked onto the sheet tray 62*b*. The conveyance path P5*b* extends to the outlet 65*b*.

A downstream apparatus may be connected to the outlet 65*b*. Additionally, as with the stacking apparatus 60*c*, a sheet tray 69 may be provided at an outlet 65*c*. The sheet tray 69 can also stack sheets P for which the image quality is determined to have failed and sheets P for which the image quality is determined to have passed. In this manner, the type of the sheet P discharged to the sheet trays 61*b*, 61*c*, 62*a*, 62*b*, 62*c*, and 69 is determined in advance based on settings made by the user.

The sheet trays 61*c*, 62*c*, and 69 provided in the stacking apparatus 60*c* may be called an "upper tray", a "middle tray", and a "lower tray", respectively. A post-processing unit 68 may include a stapling processor that bundles the sheets P discharged from the stacking apparatus 60*b* to form a sheet bundle and staples the sheet bundle. The post-processing unit 68 may include a binding processor that folds sheet bundle in half. The post-processing unit 68 may include a cutting processor that cuts a sheet bundle.

Each of the conveyance paths P1, P2, P3, P4, and P5 is provided with one or more conveyance rollers 63. The conveyance rollers 63 convey the sheet P from the upstream side to the downstream side in a conveyance direction of the sheet P. The conveyance rollers 63 may be roller pairs, each including two rollers that convey the sheet P with the sheet P located therebetween.

Note that it is sufficient for the number of stacking apparatuses 60 connected to the downstream side of the inspection apparatus 50 to be at least one. In addition, it is sufficient for the number of sheet trays 61, 62, and 69 provided in the stacking apparatus 60 connected to the downstream side of the inspection apparatus 50 to be at least two in total. In addition, it is sufficient for the number of flappers F1 and F2 to be at least one.

Note that a conveyance path from the reading position where the image sensor 54 reads the image on the sheet (or where the image sensor 55 reads the image on the sheet) to a branch position of a flapper F2*c* may be called a "main path". The conveyance path P4*a* that branches from the main path at the branch position of the flapper F2*a* may also be called a "branch path". Likewise, the conveyance path P2*b* that branches from the main path at the branch position of the flapper F1*b* may also be called a "branch path". Furthermore, the conveyance path P4*b* that branches from the main path at the branch position of the flapper F2*b* may also be called a "branch path". Further still, a conveyance path P2*c* that branches from the main path at the branch position of a flapper F1*c* may also be called a "branch path". Finally, a conveyance path P4*c* that branches from the main path at the branch position of the flapper F2*c* may also be called a "branch path". In the stacking apparatus 60*a* illustrated in FIG. 1, the path from the reading position through the conveyance path P1*a* corresponds to the main path. In other words, the first branch path that branches from the main path corresponds to the conveyance path P4*a*. Each conveyance path functions as a conveyance path that guides the sheets.

<Controller>

Figure 2:
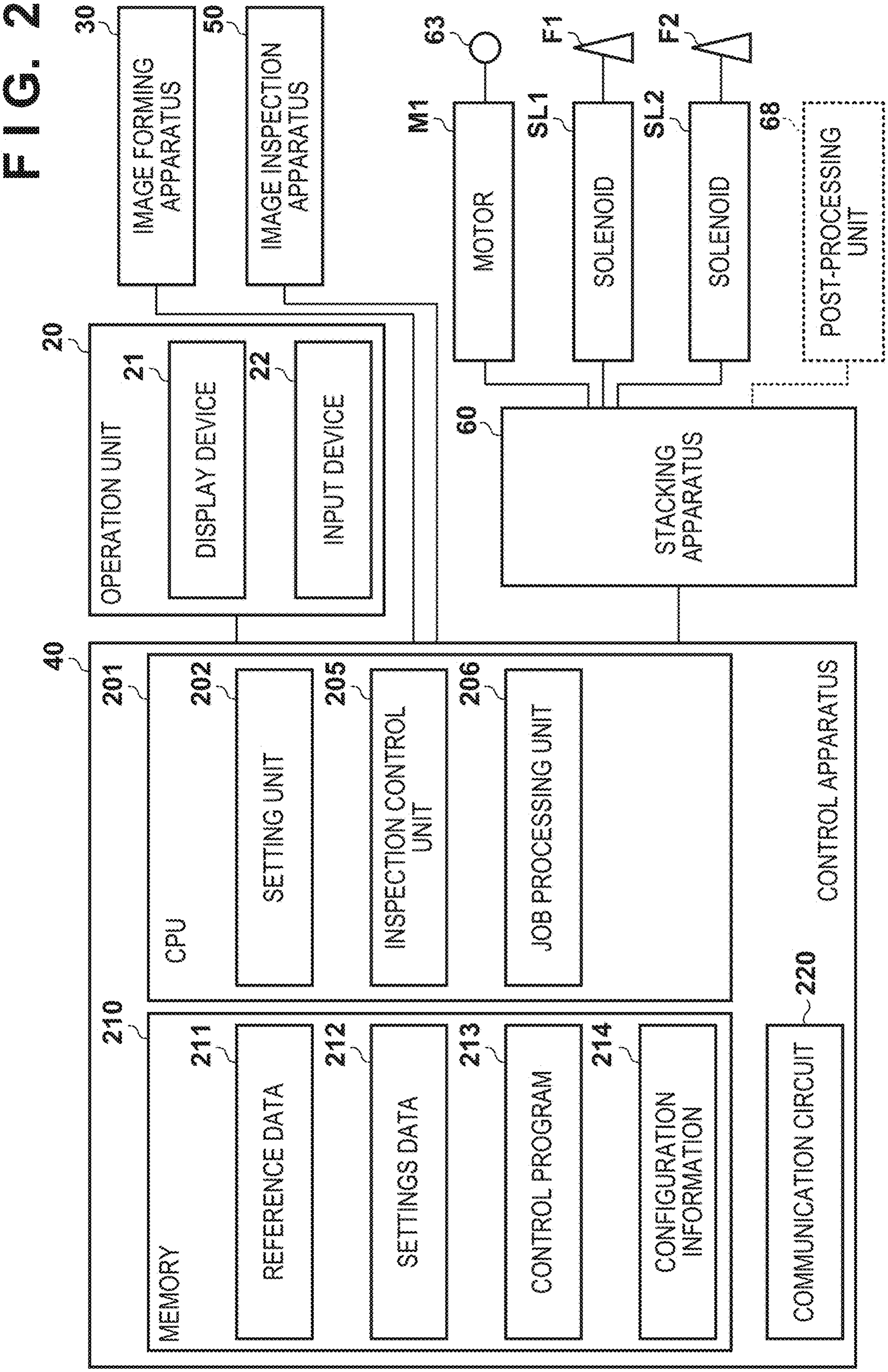
FIG. 2 is a diagram illustrating a control apparatus.

FIG. 2 illustrates the control apparatus 40 in detail. A CPU 201 implements a plurality of functions by executing a control program 213 stored in a memory 210. The CPU 201 may include a plurality of processors or CPU cores. Some or all of the plurality of functions implemented by the CPU 201 may be implemented by hardware circuitry different from the CPU 201.

The memory 210 is a storage device including a read-only memory (ROM), a random access memory (RAM), a solid-state drive (SSD), a hard disk drive (HDD), or the like.

A communication circuit 220 includes a network interface that connects to a local area network, and a communication interface that communicates with the image forming apparatus 30, the inspection apparatus 50, and the stacking apparatuses 60.

The CPU 201 communicates with the image forming apparatus 30, the inspection apparatus 50, and the stacking apparatuses 60 through the communication circuit 220.

The operation unit 20 includes a display device 21 and an input device 22. The operation unit 20 may include an audio circuit and a speaker that output messages to a user.

The CPU 201 functions as a setting unit 202, an inspection control unit 205, and a job processing unit 206 in accordance with the control program 213.

The setting unit 202 displays an inspection settings screen and a job input screen in the display device 21 provided in the operation unit 20. The setting unit 202 accepts setting instructions, job execution instructions, and the like from the user through the input device 22 provided in the operation unit 20. The setting unit 202 accepts sheet information, inspection content (misalignment detection, black spot detection, and the like), and inspection levels, for example. The inspection content may be called "inspection items". The sheet information includes the type of the sheet P and the length of the sheet P in the conveyance direction (which may be called the "lengthwise direction"). The inspection level indicates the strictness of the image inspection. The setting unit 202 stores settings data 212, which is information pertaining to image inspection, such as the sheet information, inspection content, inspection level, and the like set by the user through the display device 21, in the memory 210.

The memory 210 further stores reference data 211 and configuration information 214.

The reference data 211 is comparison data used as passing criteria in the image inspection. The reference data 211 may be, for example, document image data (RIP image data) associated with a print job received from a host computer outside the image forming system. "RIP" is an acronym for "Raster Image Processing". The reference data 211 may be image data obtained by, for example, reading one or more sheets on which an image corresponding to a reference image is formed.

The configuration information 214 is information indicating the configurations of the plurality of apparatuses that constitute the image inspection system 100 (the image forming apparatus 30, the inspection apparatus 50, and the stacking apparatuses 60). The configuration information 214 is collected from the image forming apparatus 30 and the stacking apparatuses 60 by the CPU 201 through the communication circuit 220 when the image inspection system 100 is started up. The configuration information 214 can include function information indicating the functions of each apparatus (image forming, sheet stacking, inspection, and post-processing), and internal information. The internal information indicates the conveyance distance of each of the conveyance paths P1, P2, P3, P4, and P5, the installation positions of the conveyance rollers 63, the installation positions of the flappers F1 and F2, the installation positions of the sheet trays 61, 62, and 69, and the like. The flappers F1 and F2 may be called "guide plates", "guide members", or "branch claws".

The inspection control unit 205 controls the inspection apparatus 50 based on the settings data 212. For example, when the reference data 211 is requested by the inspection apparatus 50 through the communication circuit 220, the inspection control unit 205 sends the reference data 211 to the inspection apparatus 50. The inspection control unit 205 obtains information on the result of the image inspection from the inspection apparatus 50 serving as an inspection unit, through the communication circuit 220. Based on the inspection result, the inspection control unit 205 controls the flappers F1 and F2 to discharge the sheet P into the sheet tray, among the sheet trays 61, 62, and 69, which has been designated by the user.

The job processing unit 206 controls print jobs for printing images onto the sheets P, stacking jobs for stacking sheet bundles in the stacking apparatuses 60*a* and 60*b*, post-processing jobs for stacking sheet bundles in the stacking apparatus 60*c*, and the like. The job processing unit 206 may store job data (job information) required to execute the jobs in the memory 210.

The stacking apparatuses 60 drive a motor M1 to rotate the conveyance rollers 63 in accordance with control commands from the job processing unit 206.

The stacking apparatuses 60 drive solenoids SL1 and SL2 to switch the flappers F1 and F2 in accordance with control commands from the job processing unit 206. As a result, the sheet P is guided and conveyed to either the sheet tray 61, the sheet tray 62, or the stacking apparatus 60*c*. For example, if the result of the image inspection by the inspection apparatus 50 is "no go", the job processing unit 206 controls the stacking apparatuses 60 to discharge the sheet P determined to be a "no go" to the sheet tray 62. The image forming apparatus 30 also includes a solenoid that drives flappers and a motor that drives conveyance rollers, but these are not shown.

<Inspection Apparatus>

Figure 3:
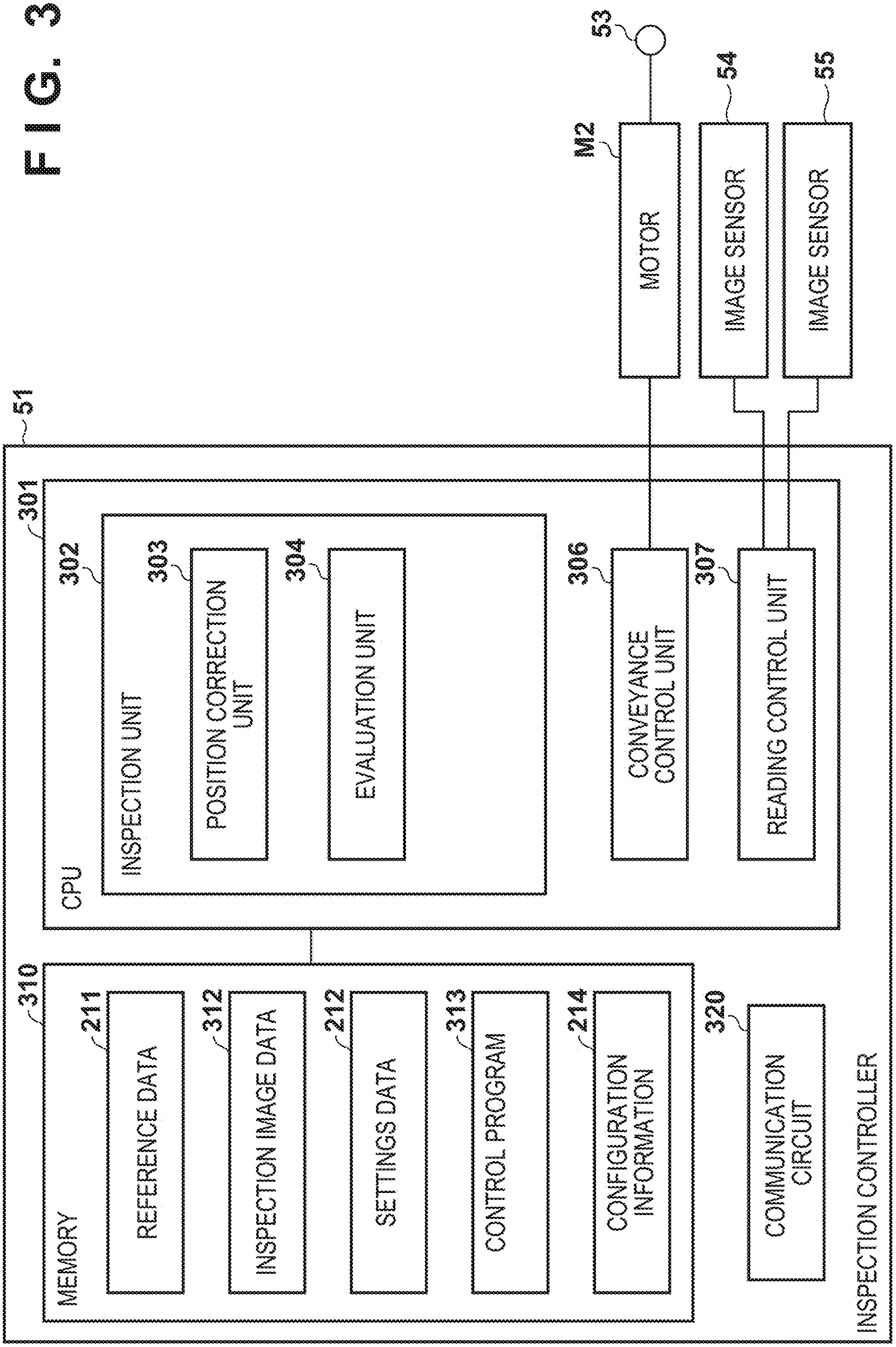
FIG. 3 is a diagram illustrating an inspection controller.

FIG. 3 illustrates an inspection controller 51 provided in the inspection apparatus 50 in detail. A CPU 301 implements a plurality of functions by executing a control program 313 stored in a memory 310. Some or all of the plurality of functions may be implemented by hardware circuitry different from the CPU 301.

The memory 310 is a storage device including a ROM, a RAM, an SSD, an HDD, and the like. The CPU 301 is connected to the control apparatus 40 through a communication circuit 320, and receives various types of commands and data, sends inspection results, and the like.

An inspection unit 302 executes image inspection according to the settings data 212 received from the control apparatus 40 through the communication circuit 320, and sends an image inspection result to the control apparatus 40. The configuration may be such that the CPU 201 performs the inspection, or such that an external PC or the like connected to the image forming system performs the inspection. "PC" is an acronym for "Personal Computer".

A position correction unit 303 performs position correction on reading results from the image sensors 54 and 55. If the sheet P is read by the image sensors 54 and 55 while the sheet P is slanted, the sheet P may be slanted in the read image. The leading end of the sheet P may also deviate from an ideal position in the read image. The position correction unit 303 therefore corrects the position of the sheet P in the reading result by rotating the reading result, shifting coordinates, and the like.

The reference data 211 is comparison data used in the inspection of the image quality. Inspection image data (read image data) 312 is image data generated by the image sensors 54 and 55 reading the sheet P.

An evaluation unit 304 compares the reference data 211 with the inspection image data 312 and determines whether the image formed on the sheet P satisfies the inspection standard.

For example, if the inspection content is "misalignment detection", the evaluation unit 304 may determine that the inspection is passed if the amount of misalignment between the position of the image in the reference data 211 and the position of the image in the inspection image data 312 is no greater than a predetermined value. The evaluation unit 304 may determine that the inspection has failed if the amount of misalignment exceeds the predetermined value. In other words, the amount of misalignment between the position of the image in the reference data 211 and the position of the image in the inspection image data 312 being no greater than the predetermined value corresponds to the inspection standard being satisfied. Meanwhile, the amount of misalignment between the position of the image in the reference data 211 and the position of the image in the inspection image data 312 being greater than the predetermined value corresponds to the inspection standard not being satisfied.

If the inspection content is set to "black spot detection", the evaluation unit 304 may determine that the inspection is passed if the size of a black spot which is not present in the image in the reference data 211, but which is present in the image in the inspection image data 312, is no greater than a determination threshold. In other words, a black spot corresponds to a noise image which is absent from the image corresponding to the reference data 211, but which is present in an image corresponding to the inspection image data 312 to which reduction processing has been applied. The evaluation unit 304 may determine that the inspection has failed if the size of the black spot exceeds the determination threshold. In other words, the size of the black spot not exceeding the determination threshold corresponds to the inspection standard being satisfied. On the other hand, the size of the black spot exceeding the determination threshold corresponds to the inspection standard not being satisfied.

Although misalignment detection and black spot detection are described in the present embodiment as the inspection content, these are merely examples. For example, "streak detection" or the like may be included as the inspection content. "Streak detection" refers to detecting a streak-shaped image that is not present in the original image. In other words, a streak corresponds to a noise image which is absent from the image corresponding to the reference data 211, but which is present in an image corresponding to the inspection image data 312 to which reduction processing has been applied. Streaks can occur when it is necessary to clean, replace, or repair a component involved in image formation. In other words, determination processing for determining whether a "streak" is present may be performed by finding the degree to which the image corresponding to the reference data 211 matches the image corresponding to the inspection image data 312 to which reduction processing (image processing) has been applied.

In the present embodiment, the relative positions of the image in the reference data 211 and the image in the inspection image data 312 are inspected when the inspection content is "misalignment detection", but this is merely one example. For example, the absolute position of the image in the inspection image data 312 with respect to an edge of the sheet may be inspected. In this case, if the distance between the absolute position of the image in the reference data 211 and the absolute position of the image in the inspection image data 312 is no greater than the threshold, the inspection is determined to have passed. If the distance exceeds the threshold, the inspection is determined to have failed.

The evaluation unit 304 generates an inspection result indicating the determination result and sends the inspection result to the control apparatus 40 and the stacking apparatuses 60 through the communication circuit 320.

When the configuration information 214 is requested by the control apparatus 40 through the communication circuit 320, the CPU 301 reads out and sends the configuration information 214 to the control apparatus 40.

The configuration information 214 of the inspection apparatus 50 indicates, for example, performance information of the image sensors 54 and 55, the number of the image sensors 54 and 55, the surfaces read by of the image sensors 54 and 55 (upper surface or lower surface), the conveyance distances from the reading positions of the image sensors 54 and 55 to the outlet, and the like.

A conveyance control unit 306 drives a motor M2 to rotate the conveyance rollers 53. A reading control unit 307 controls the image sensors 54 and 55 to read the sheet P and generate the inspection image data 312. The image sensor 54 reads a first surface of the sheet P, and the image sensor 55 reads a second surface of the sheet P. This enables images on both sides of the sheet P to be inspected in the present embodiment.

<Stacking Apparatuses>

Figure 4:
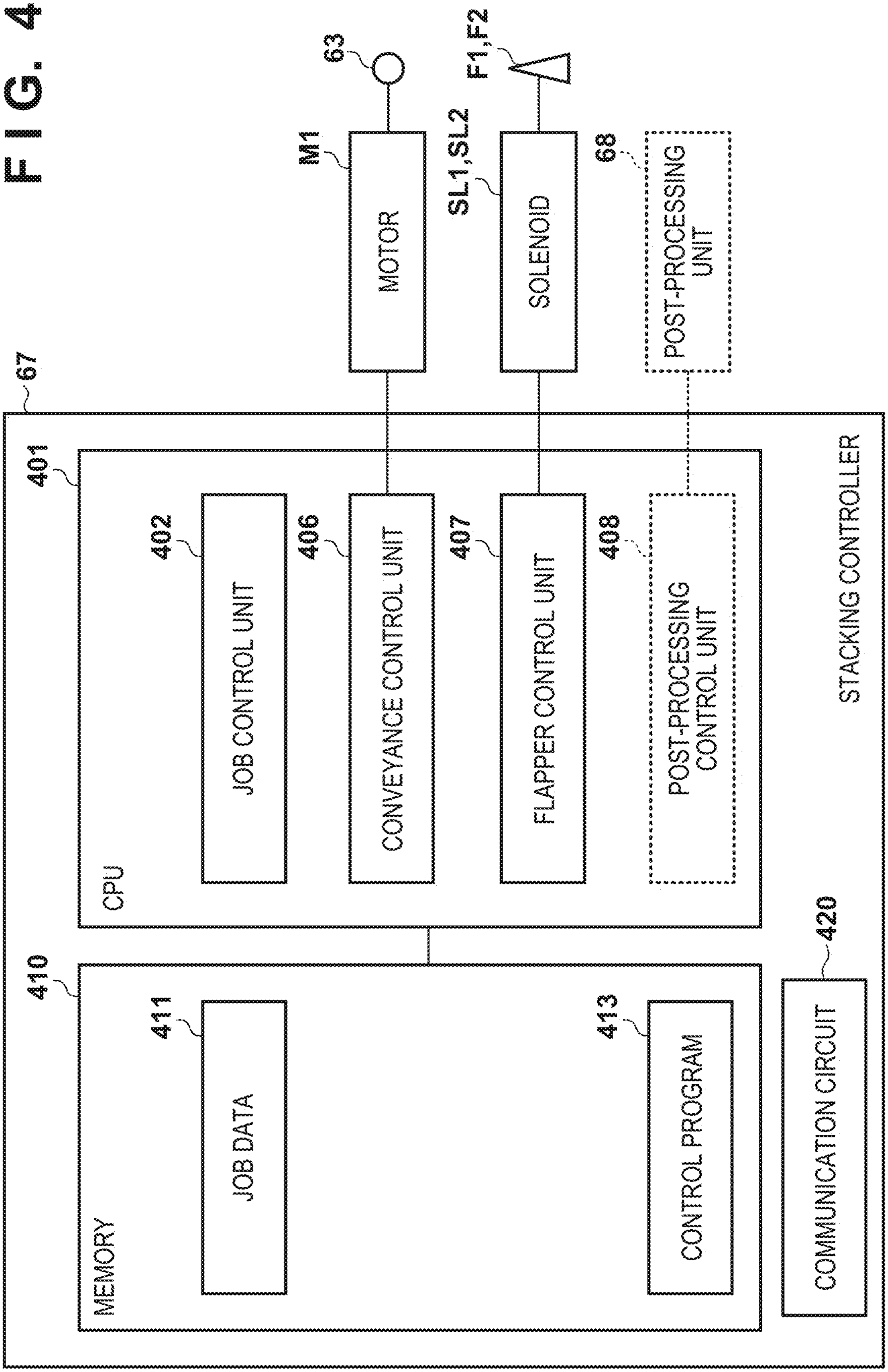
FIG. 4 is a diagram illustrating a stacking controller.

FIG. 4 illustrates a stacking controller 67 provided in each of the stacking apparatuses 60 in detail. A CPU 401 implements a plurality of functions by executing a control program 413 stored in a memory 410. Some or all of the plurality of functions may be implemented by hardware circuitry aside from the CPU 401.

The memory 410 is a storage device including a ROM, a RAM, an SSD, an HDD, and the like. The CPU 401 is connected to the control apparatus 40 through a communication circuit 420, and receives various types of commands and data, sends execution results, and the like.

A job control unit 402 executes job data 411 from the control apparatus 40 through the communication circuit 420. The job data 411 includes information indicating the content of the job, for example.

A conveyance control unit 406 starts the rotation of the motor M1 in accordance with a rotation command received from the control apparatus 40. The conveyance control unit 406 stops the rotation of the motor M1 in accordance with a stop command received from the control apparatus 40. The conveyance rollers 63 driven by the motor M1 rotate, stop, or the like as a result.

A flapper control unit 407 drives the solenoids SL1 and SL2 to switch the flappers F1 and F2 in accordance with switching commands received from the control apparatus 40 for each sheet P. The discharge destination of the sheet P is set as a result.

Instead of switching commands received from the control apparatus 40, the flappers F1 and F2 may be controlled based on the inspection result received from the inspection apparatus 50.

If the stacking apparatus 60*c* is a post-processing apparatus, the stacking apparatus 60*c* includes a post-processing control unit 408. The post-processing control unit 408 controls the post-processing unit 68 in accordance with post-processing execution commands received from the control apparatus 40.

<Settings Screens (User Interface)>

Figure 5:
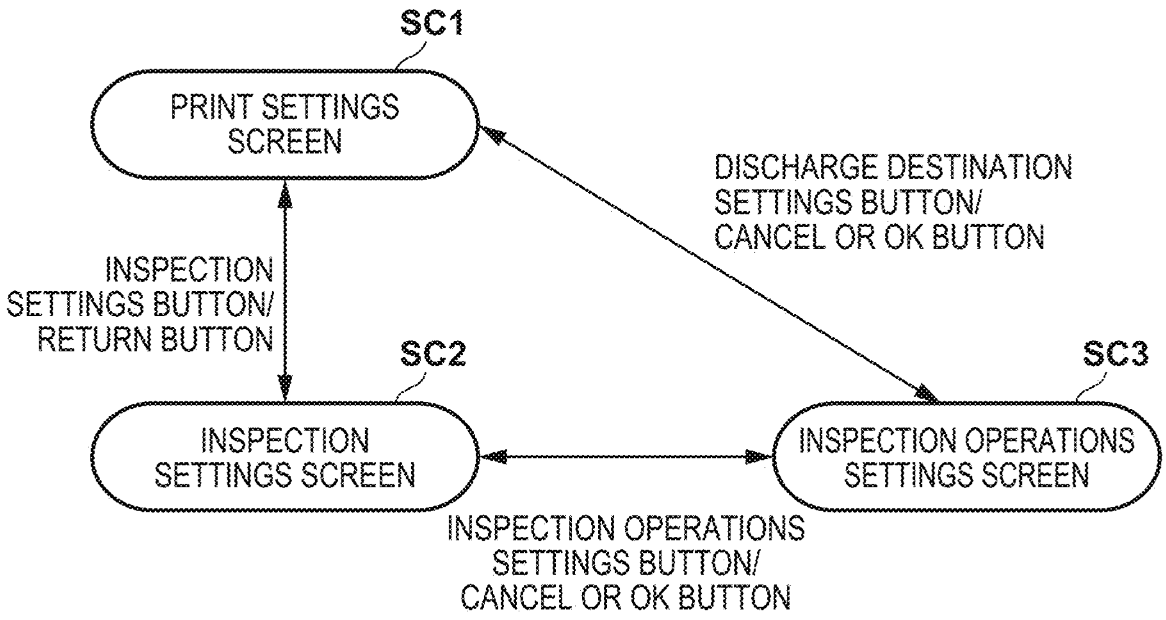
FIG. 5 is a diagram illustrating transitions among settings screens.

FIG. 5 illustrates state transitions among various settings screens displayed in the display device 21. A print settings screen SC1 is a screen for accepting print job settings (color printing or black-and-white printing), a sheet selection, and an instruction to start printing. An inspection settings screen SC2 is a screen for accepting detailed settings for the image inspection. An inspection operation settings screen SC3 is a screen for accepting the setting of a discharge mode and the setting of the discharge destination of the sheet P. As illustrated in FIG. 5, the transitions among these screens are implemented by operating buttons provided in the respective screens.

Figure 6:
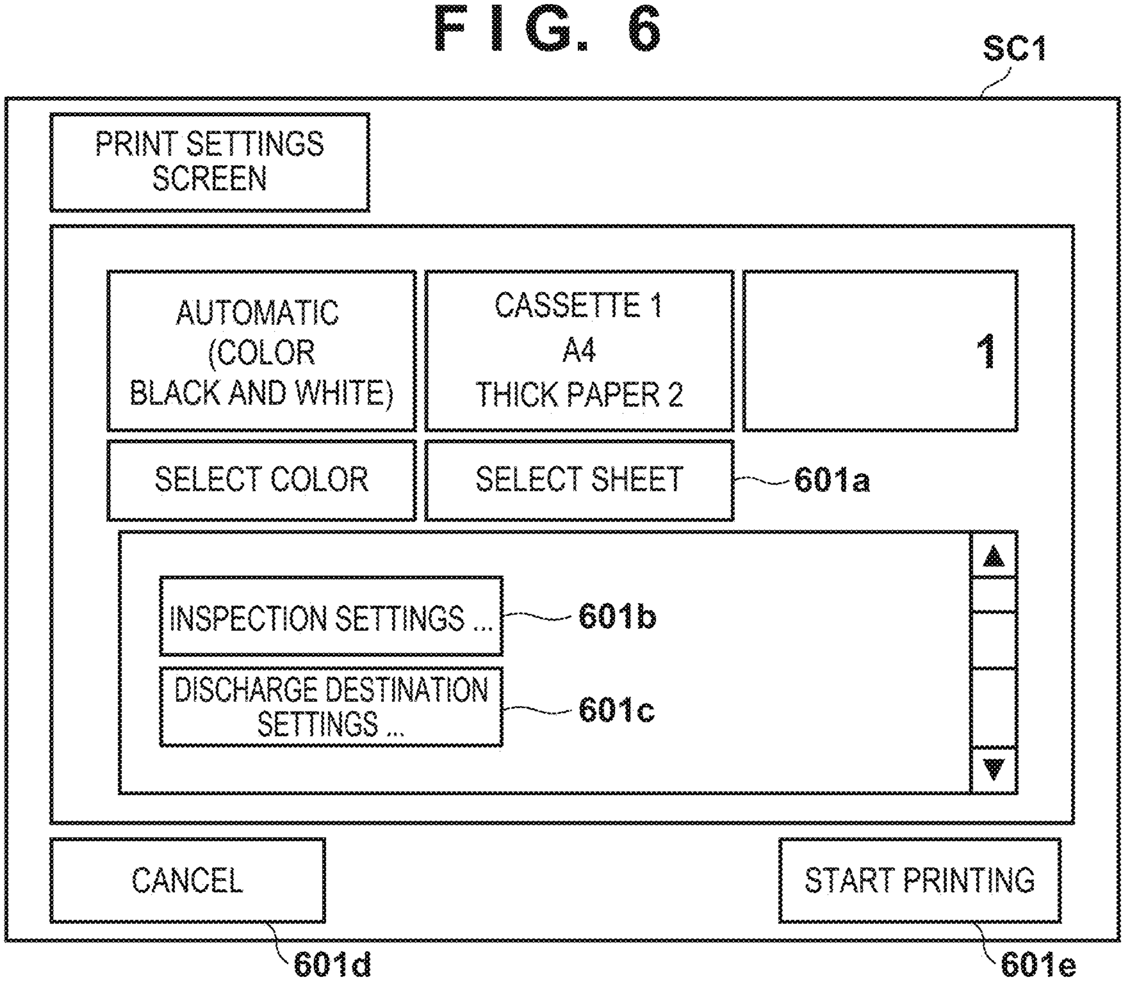
FIG. 6 is a diagram illustrating a print settings screen.

FIG. 6 illustrates a print settings screen SC1. The print settings screen SC1 may be called a "job input screen". A button 601*a* is a button for designating of the size of the sheet P to be printed on (including the length of the sheet in the conveyance direction), the basis weight, and the sheet cassette 11. A button 601*b* is a button for instructing a transition from the print settings screen SC1 to the inspection settings screen SC2. A button 601*c* is a button for instructing a transition from the print settings screen SC1 to a discharge destination settings screen SC4. A button 601*d* is a button for instructing the content of the settings to be cancelled. When the button 601*d* is operated by an operator (the user), the screen transitions to a predetermined default screen. A button 601*e* is a button for instructing printing to start.

Figure 7:
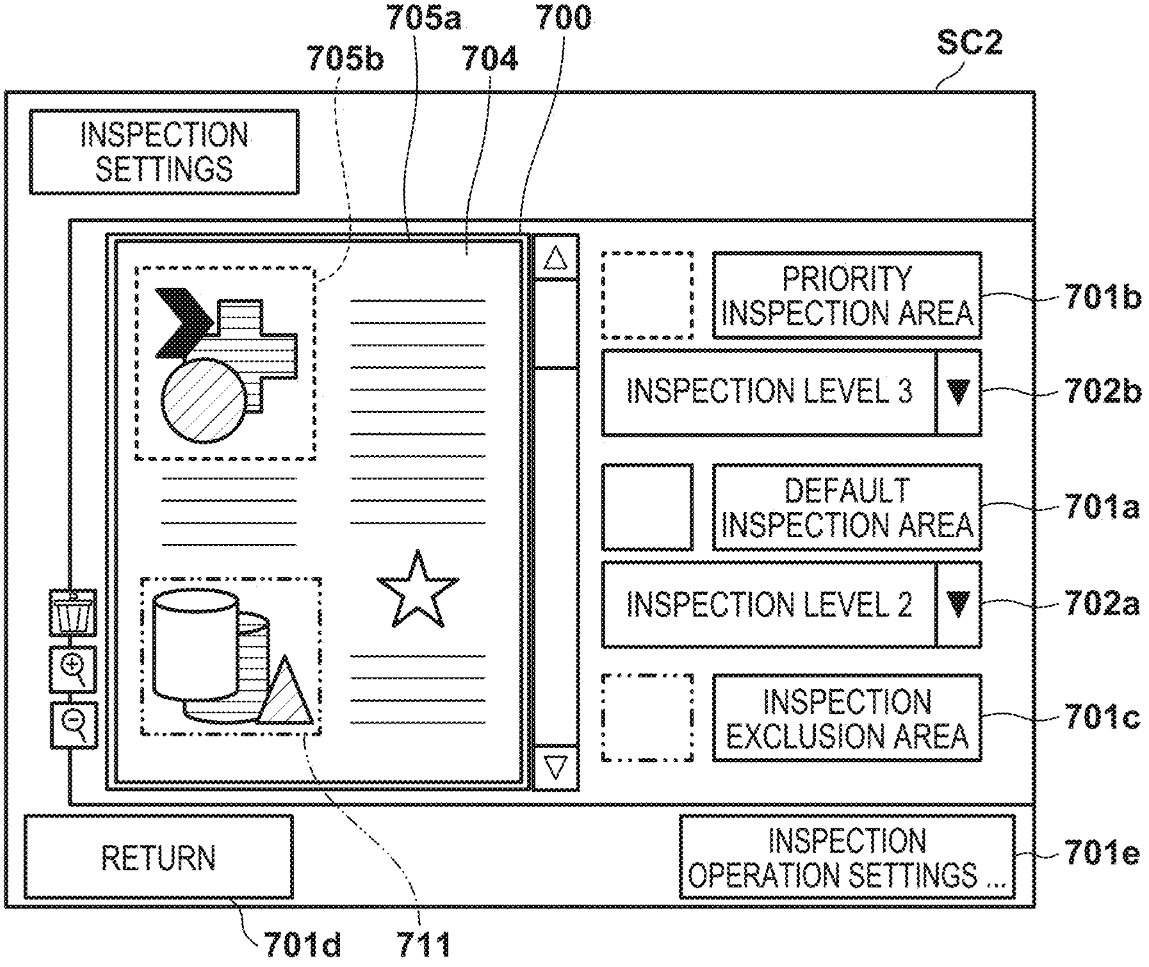
FIG. 7 is a diagram illustrating an inspection settings screen.

FIG. 7 illustrates the inspection settings screen SC2. The inspection settings screen SC2 is a screen that accepts instructions from the operator for setting an inspection area 705 for the quality inspection executed by the inspection apparatus 50. In FIG. 7, a display region 700 displays an image 704 to be printed, inspection areas 705*a* and 705*b*, an inspection exclusion area 711, and the like.

The inspection areas 705*a* and 705*b* and the inspection exclusion area 711 are set using a mouse or a touch panel that is part of the input device 22. The inspection area 705*a* is a default inspection area set by operating a button 701*a*. The default inspection area is, for example, an inspection area inspected according to default content. A menu 702*a* is a pull-down menu for setting an inspection level (inspection accuracy) to be applied to the inspection area 705*a*. In this example, inspection level 1 has the lowest inspection accuracy, and the inspection accuracy increases as the number of the inspection level increases.

An inspection area 705*b* is a priority inspection area set by operating a button 701*b*. The priority inspection area is, for example, an inspection area to be inspected at a high level of accuracy. In the example illustrated in FIG. 7, the graphic including the circle, the cross, and the like is subject to the high-accuracy inspection.

A menu 702*b* is a pull-down menu for setting an inspection level (inspection accuracy) to be applied to the inspection area 705*b*. The pull-down menu may be called a "drop-down list".

The inspection exclusion area 711 is an area that is set not to be inspected, by operating a button 701*c*. The cylinders and triangle do not require a high-accuracy inspection. A region including these graphics may therefore be set to the inspection exclusion area. In this manner, the inspection level can be set for each of regions present in the print target. The user can therefore set appropriate passing criteria. As a result, a printed product having a permissible quality is determined to pass, which reduces wasteful reprinting and improves productivity. The wasteful discarding of sheets P is also reduced.

A button 701*d* is a button for instructing the screen to return to the print settings screen SC1, which is the original screen. The button 701*d* may be implemented as a cancel button. In this case, when the button 701*d* is pressed, the inspection settings input through the inspection settings screen SC2 are discarded. If the button 701*d* is implemented as a cancel button, an OK button for applying the inspection settings and returning to the print settings screen SC1 is also implemented.

A button 701*e* is a button for instructing a transition to the inspection operation settings screen SC3.

Figure 8A:
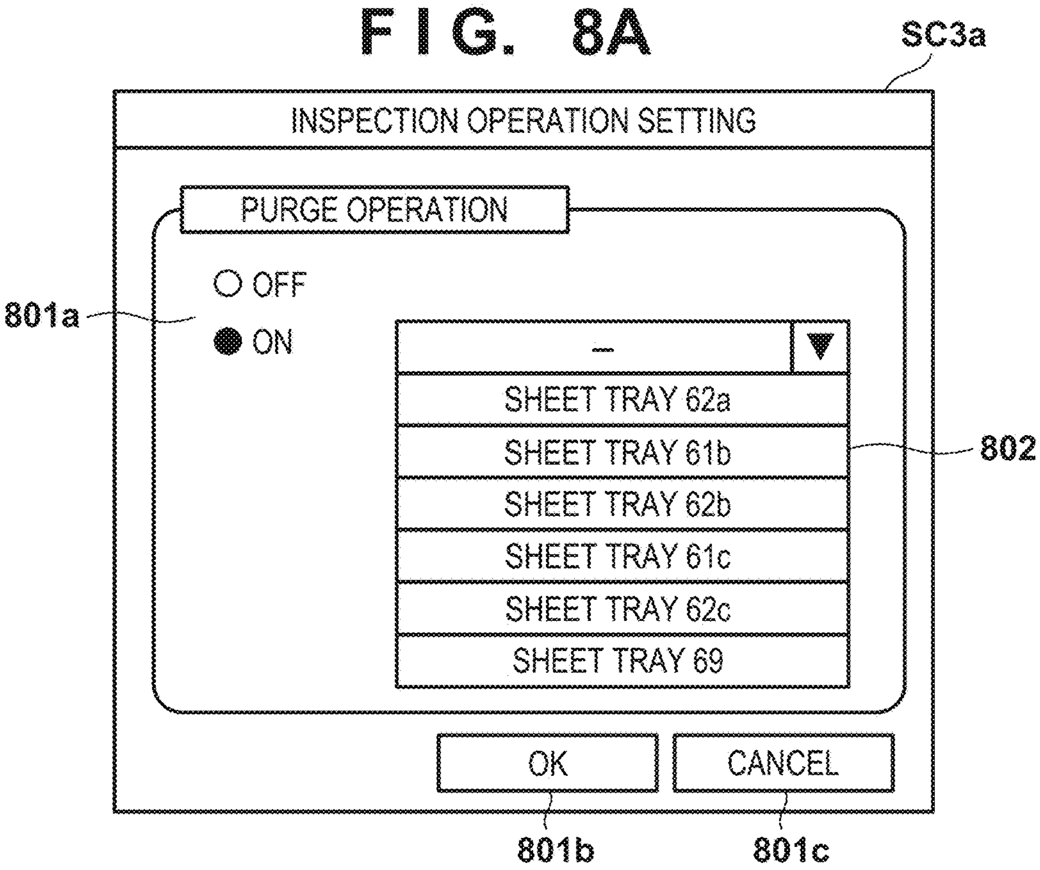
FIG. 8A is a diagram illustrating an inspection operation settings screen.
Figure 8B:
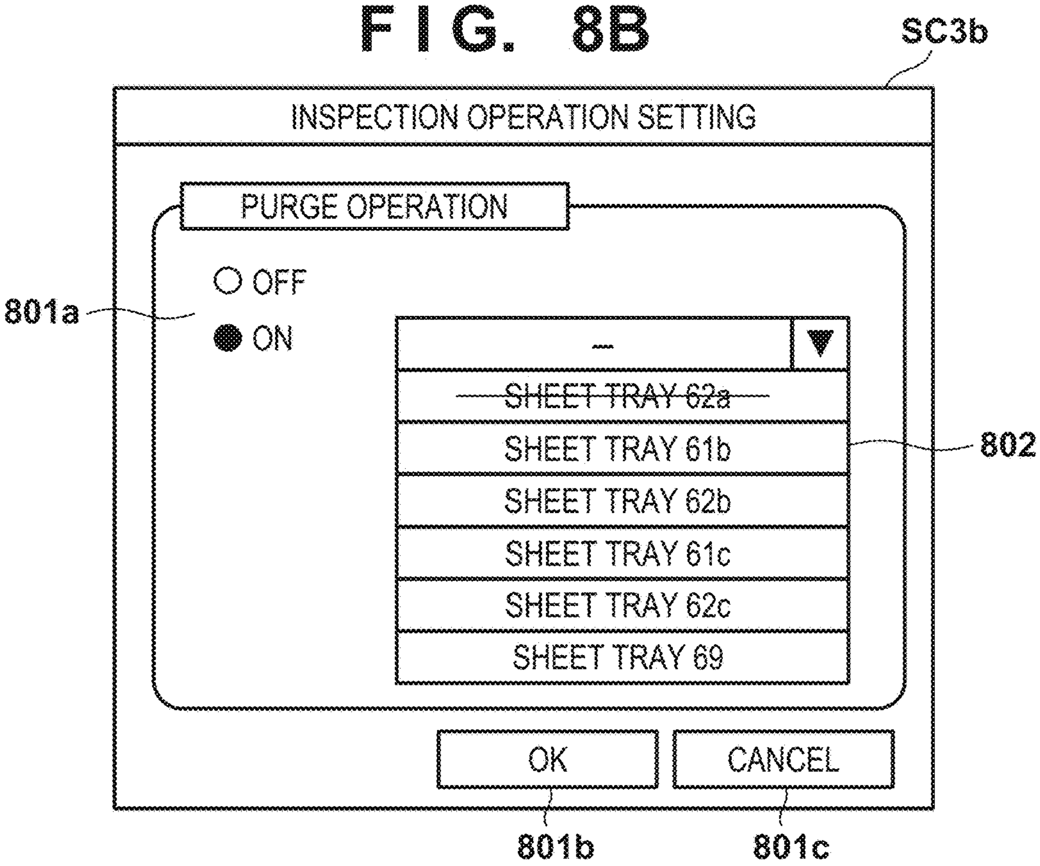
FIG. 8B is a diagram illustrating an inspection operation settings screen.

FIGS. 8A and 8B illustrate inspection operation settings screens SC3*a* and SC3*b*, respectively. A button 801*a* is a mode selection button for specifying the discharge mode for a printed product determined to have failed the inspection. "Purge operation" is a mode in which a printed product determined to have passed and a printed product determined to have failed are discharged to different discharge destinations. In this example, the button 801*a* is a radio button, and thus the button 801*a* toggles the purge operation on and off. When the purge operation is off, a printed product determined to have passed and a printed product determined to have failed are discharged to the same discharge destination.

A menu 802 is a pull-down menu that, when the purge operation is on, displays a list of candidates for discharge destinations to which a printed product determined to have passed and a printed product determined to have failed can be discharged, and accepts the selection of a discharge destination. For example, the user can select a stacking tray to which a printed product determined to have passed is to be discharged by selecting a stacking tray from the menu 802 after pressing a pass button 801*d*. Likewise, the user can select a stacking tray to which a printed product determined to have failed is to be discharged by selecting a stacking tray from the menu 802 after pressing a fail button 801*e*.

The menu 802 of the inspection operation settings screen SC3*a* displays all the sheet trays in the image inspection system 100 as discharge destination candidates. On the other hand, the menu 802 of the inspection operation settings screen SC3*b* displays only some of the sheet trays in the image inspection system 100 as discharge destination candidates.

For example, if, when images on both sides of the sheet P are inspected, the length of the sheet P in the conveyance direction is longer than the conveyance distance (the length of the conveyance path) from the image sensor 55 (the reading position at which the image sensor 55 reads the image) to the flapper F2*a*, the sheet P will reach the flapper F2*a* before the inspection result of the sheet P is known. As a result, the discharge destination of the sheet P cannot be switched between the sheet tray 62*a* and sheet trays downstream from the sheet tray 62*a* in accordance with the inspection result. Additionally, if, when an image on the front side of the sheet P is inspected, the length of the sheet P in the conveyance direction is longer than the conveyance distance from the image sensor 54 (the reading position at which the image sensor 54 reads the image) to the flapper F2*a*, the sheet P will reach the flapper F2*a* before the inspection result of the sheet P is known. As a result, the discharge destination of the sheet P cannot be switched between the sheet tray 62*a* and sheet trays downstream from the sheet tray 62*a* in accordance with the inspection result. In the present embodiment, the length of the conveyance path from the reading position to the flapper F2*a*, which corresponds to the branch position, is 1000 mm, for example. Thus, for example, when inspecting an image on a long sheet, which is a sheet having a length in the conveyance direction that is longer than 1000 mm, the sheet tray 62*a* is displayed as unselectable in the menu 802 of the inspection operation settings screen SC3*b*. Note that when inspecting an image on a sheet having a length in the conveyance direction that is shorter than 1000 mm, the sheet tray 62*a* is displayed as selectable in the menu 802 of the inspection operation settings screen SC3*b*. In other words, according to the present embodiment, when an image on a long sheet is inspected, the inspected long sheet is not discharged to the stacking unit corresponding to the initial branch path among the plurality of branch paths (the stacking unit, among the plurality of stacking units, for which the conveyance path from the reading position is the shortest). The inspected long sheet is discharged to the stacking unit corresponding to the branch path that branches from the main path at the branch position located further downstream in the conveyance direction than the branch position that corresponds to the initial branch path.

Note that, for example, there may be cases where the length of the sheet P in the conveyance direction is longer than the length of the conveyance path from the reading position to the flapper F1*b*, which corresponds to the branch position. In this case, the sheet P will reach the flapper F1*b* before the inspection result for the sheet P is known. As a result, the discharge destination of the sheet P cannot be switched between the sheet tray 62*b* and sheet trays downstream from the sheet tray 62*b* in accordance with the inspection result. The discharge destination of the sheet P also cannot be switched between the sheet tray 62*a* and sheet trays downstream from the sheet tray 62*a* in accordance with the inspection result. In light of this, if, for example, the length of the sheet P in the conveyance direction is longer than the conveyance distance from the reading position to the flapper F1*b*, the sheet trays 62*a* and 61*b* are displayed as unselectable in the menu 802 of the inspection operation settings screen SC3*b*.

Examples of a display format that indicates an item is unselectable include a strikethrough display as illustrated in FIG. 8B, a grayed-out display, and the like.

A button 801*b* is a button operated to confirm the settings once the user has finished making the inspection operation settings. Note that when the button 801*b* is pressed, the screen transitions moves from the inspection operation settings screens SC3*a* and SC3*b* to the print settings screen SC1. A button 801*c* is a button instructing the settings input in the inspection operation settings screens SC3*a* and SC3*b* to be discarded and for the screen to return to the original screen (the inspection settings screen SC2).

Note that a button for returning to the inspection settings screen SC2 may be added to the inspection operation settings screen SC3. This makes it possible for the user to return to the inspection settings screen SC2 without going through the inspection operation settings screen SC3.

<Setting Unit>

Figure 9:
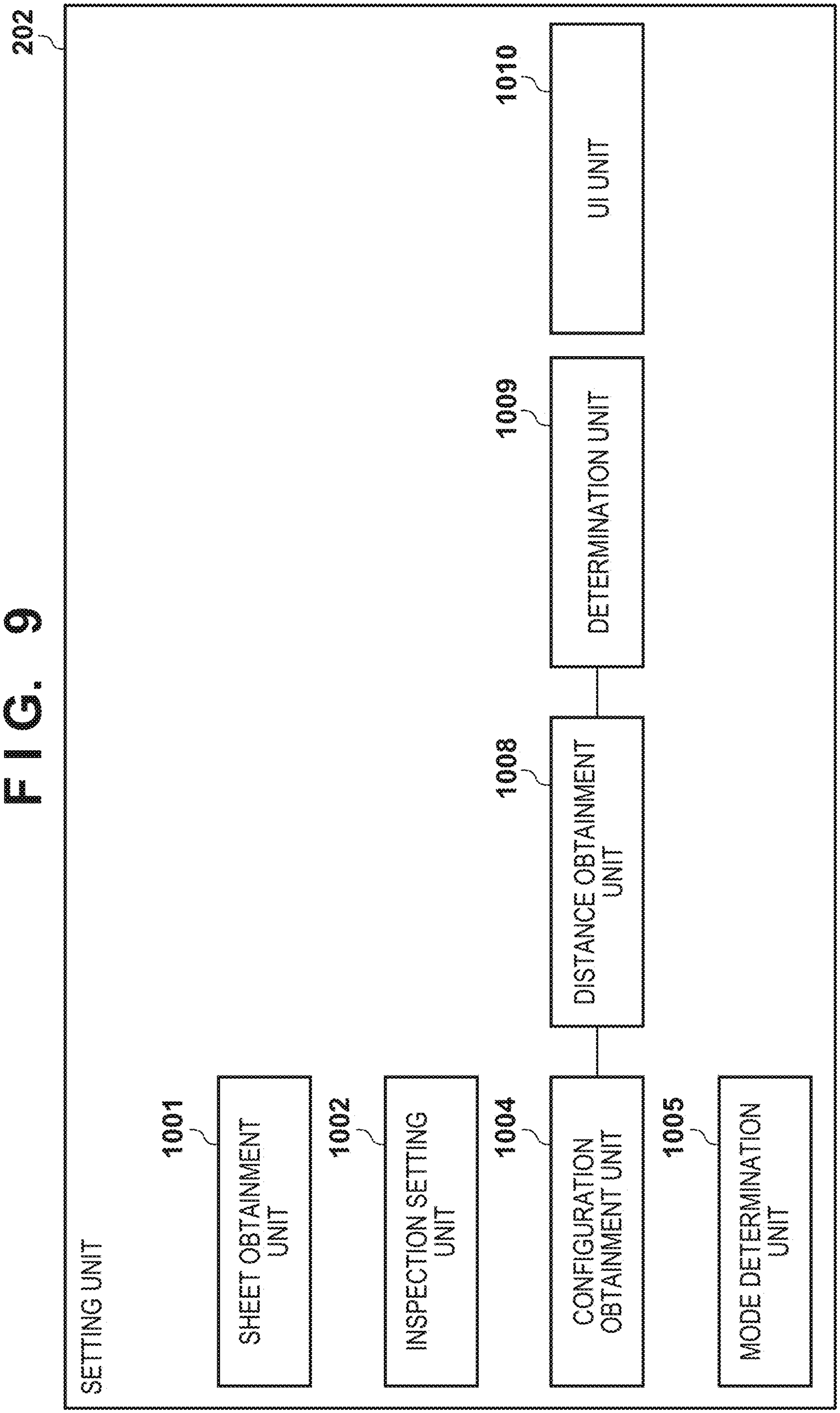
FIG. 9 is a diagram illustrating functions of a setting unit.

FIG. 9 illustrates the functions of the setting unit 202 of the CPU 201. A UI unit 1010 displays the print settings screen SC1, the inspection settings screen SC2, and the inspection operation settings screen SC3 in the display device 21. The UI unit 1010 generates the settings data 212 based on information or instructions input through the input device 22, and stores the settings data 212 in the memory 210.

A sheet obtainment unit 1001 obtains the information on the sheet P set through the print settings screen SC1 (the size, basis weight, and sheet cassette 11) from the settings data 212 or the like. An inspection setting unit 1002 stores the inspection settings input through the inspection settings screen SC2 in the settings data 212.

A configuration obtainment unit 1004 communicates with the image forming apparatus 30, the inspection apparatus 50, and the stacking apparatuses 60*a* to 60*c*, obtains the configuration information 214 thereof, and stores that information in the memory 210, when the image inspection system 100 is started up. A mode determination unit 1005 determines the discharge mode (e.g., turning the purge operation on/off) based on an instruction from the user, whether a discharge destination candidate is present, and the like. A distance obtainment unit 1008 obtains the conveyance distances from the inlets 64 to the flappers F1 and F2, included in the configuration information 214 obtained by the configuration obtainment unit 1004. The distance obtainment unit 1008 also obtains the conveyance distance from the image sensor 54 in the inspection apparatus 50 to an outlet (the inlet 64*a* of the stacking apparatus 60*a*) from the configuration information 214. Finally, the distance obtainment unit 1008 obtains a distance D from the image sensor 54 to each branch point.

<Flowchart>

(Setting Processing)

Figure 10:
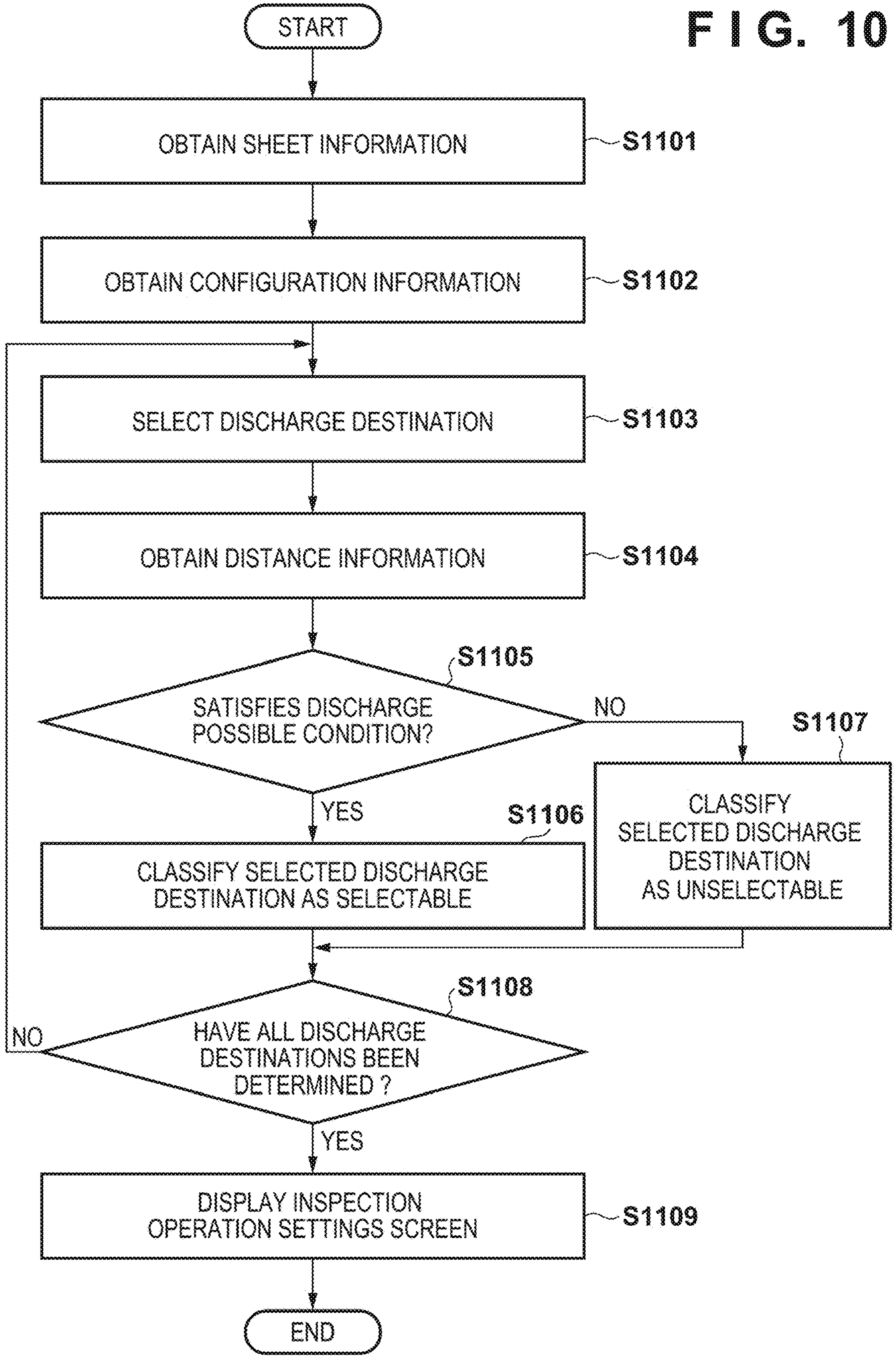
FIG. 10 is a flowchart illustrating a method for setting a discharge destination.

FIG. 10 is a flowchart illustrating setting processing (processing for generating the inspection operation settings screen SC3) executed by the CPU 201. The CPU 201 executes the following processing upon detecting that the button 701*e* has been pressed in the inspection settings screen SC2. Note that the CPU 201 is an example of a control unit and one or more processors.

In S1101, the CPU 201 (the sheet obtainment unit 1001) obtains the sheet information from the settings data 212. The sheet information includes at least a length L of the sheet P in the conveyance direction of the sheet P.

In S1102, the CPU 201 (the configuration obtainment unit 1004) obtains the configuration information 214 of the inspection apparatus 50 and the stacking apparatus 60 connected to the downstream side of the image forming apparatus 30. The configuration information 214 may be read out from the memory 210, or the CPU 201 may obtain the configuration information 214 from each of the inspection apparatus 50 and the stacking apparatus 60 through the communication circuit 220.

In S1103, the CPU 201 (the distance obtainment unit 1008) selects a single discharge destination based on the configuration information 214. Here, one sheet tray among the sheet trays 62*a*, 61*b*, 62*b*, and 69 is selected as the discharge destination for which the determination is to be made. Normally, a sheet tray located upstream in the conveyance direction of the sheet P is selected first. In other words, the sheet tray 62*a* will be selected first, and the sheet tray 69 will be selected last.

In S1104, the CPU 201 (the distance obtainment unit 1008) obtains distance information on the selected discharge destination. The distance obtainment unit 1008 obtains the distance information (e.g., the conveyance distance D) from the configuration information 214 of the selected discharge destination. The conveyance distance D for the sheet tray 62*a* is the conveyance distance from the image sensor 55 (the reading position) to the flapper F2*a* (a second branch point). The conveyance distance D for the sheet tray 61*b* is the conveyance distance from the image sensor 55 (the reading position) to the flapper F1*b* (a third branch point). The conveyance distance D for the sheet tray 62*b* is the conveyance distance from the image sensor 55 (the reading position) to the flapper F2*b* (a fourth branch point). The conveyance distance D for the sheet tray 61*c* is the conveyance distance from the image sensor 55 (the reading position) to the flapper F1*c* (a fifth branch point). The conveyance distances D for the sheet trays 62*c* and 69 are the conveyance distance from the image sensor 55 (the reading position) to the flapper F2*c* (a sixth branch point). Note that if only the image on the front surface of the sheet P is inspected, the conveyance distance D is the conveyance distance from the reading position of the image sensor 54.

In S1105, the CPU 201 (a determination unit 1009) determines whether the selected discharge destination satisfies a discharge possible condition. The discharge possible condition is D>L, for example. If the selected discharge destination satisfies the discharge possible condition, the CPU 201 moves the sequence to S1106.

In S1106, the CPU 201 (the determination unit 1009) classifies the selected discharge destination as selectable. If the selected discharge destination satisfied the discharge possible condition in S1105, the CPU 201 moves the sequence to S1107.

In S1107, the CPU 201 (the determination unit 1009) classifies the selected discharge destination as unselectable. Note that whether each discharge destination is selectable or unselectable may be stored in the memory 210 as a discharge destination setting.

In S1108, the CPU 201 (the determination unit 1009) determines whether determinations have been made for all the discharge destinations. If determinations have not been made for all the discharge destinations, the CPU 201 moves the sequence to S1103 and selects the next discharge destination. If determinations have been made for all the discharge destinations, the CPU 201 moves the sequence to S1109.

In S1109, the CPU 201 (the UI unit 1010) displays the inspection operation settings screen SC3 in the display device 21 based on the determination made in S1105.

(Printing and Inspection Processing)

Figure 11:
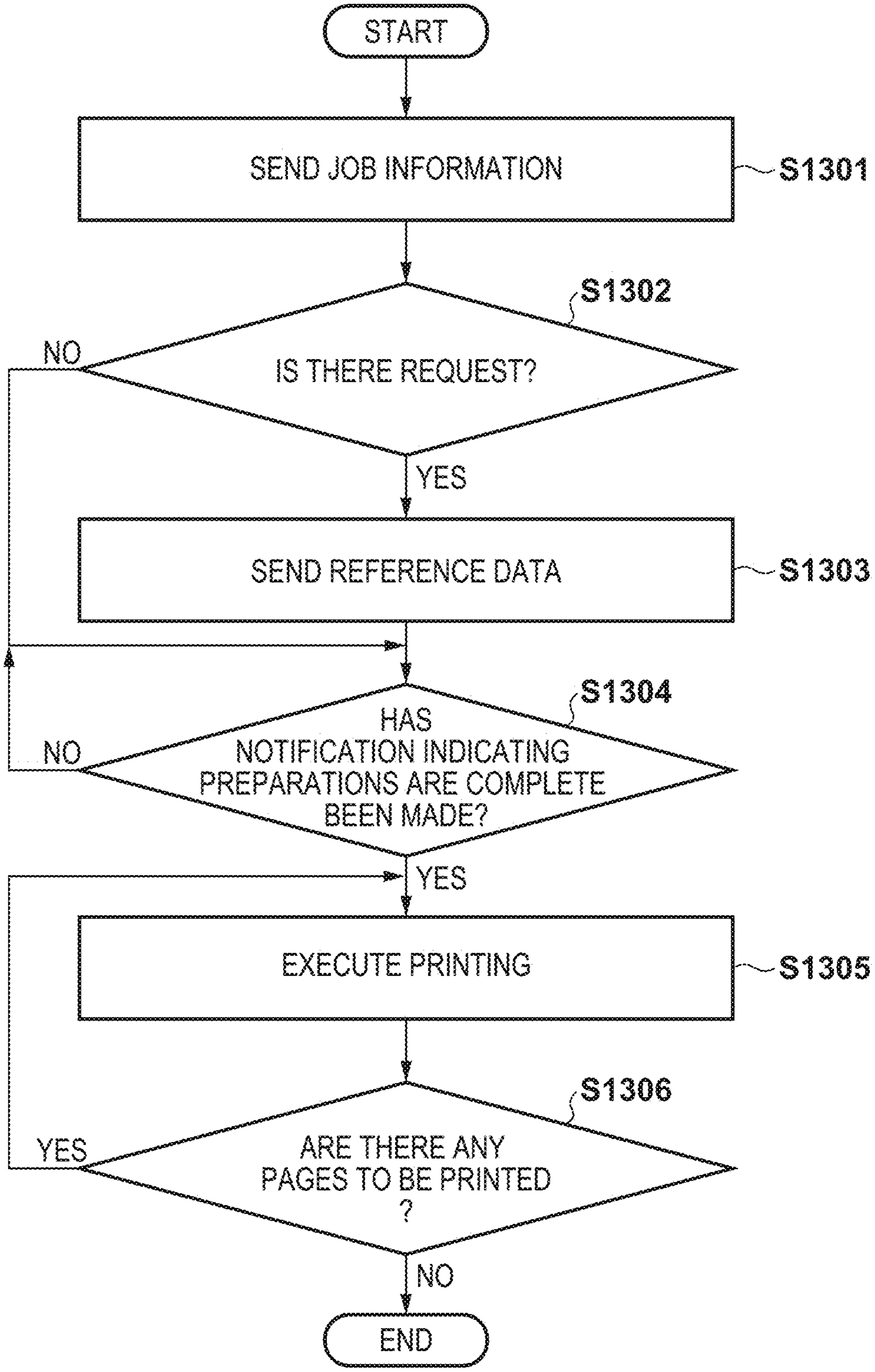
FIG. 11 is a flowchart illustrating a method for setting a discharge destination.

FIG. 11 is a flowchart illustrating printing processing executed by the CPU 201 of the control apparatus 40. The CPU 201 executes the following processing when the button 601*e* is pressed and printing is instructed to start.

In S1301, the CPU 201 (the job processing unit 206) generates the job information, including sheet information, the inspection settings, discharge destination information, and the like, based on the settings data 212, and sends the job information to the inspection apparatus 50. The sheet information includes the size, the number, and the like of the sheets P. The inspection settings include whether to perform an inspection, and the content of the inspection performed by the inspection apparatus 50 (the inspection area, the inspection level, and the like). The discharge destination information includes identification information of one of the stacking apparatuses 60*a* to 60*c* to serve as the discharge destination, and identification information of trays for a pass tray and a fail tray. The "pass tray" is a sheet tray to which sheets P which have passed the inspection are discharged. The "fail tray", meanwhile, is a sheet tray to which sheets P which have not passed the inspection are discharged. The pass tray and the fail tray are assumed to be selected in the inspection operation settings screen SC3.

In S1302, the CPU 201 (the inspection control unit 205) determines whether a request to send reference data has been received from the inspection apparatus 50. If no request has been received, the CPU 201 moves the sequence to S1304. If a request has been received, the CPU 201 moves the sequence to S1303.

In S1303, the CPU 201 (the inspection control unit 205) reads out the reference data 211 from the memory 210 and sends the reference data 211 to the inspection apparatus 50.

In S1304, the CPU 201 (the job processing unit 206) determines whether a notification indicating preparations are complete has been made by the inspection apparatus 50. The CPU 201 moves the sequence to S1305 when a notification indicating preparations are complete has been made by the inspection apparatus 50.

In S1305, the CPU 201 (the job processing unit 206) prints onto the sheet P by controlling the image forming apparatus 30.

In S1306, the CPU 201 (the job processing unit 206) determines whether there are any pages to be printed, based on the print job. In other words, the CPU 201 determines whether printing is complete for all pages. If a page to be printed remains, the CPU 201 moves the sequence to S1305, and prints the next page. If no pages remain to be printed, the CPU 201 ends the print job.

Figure 12:
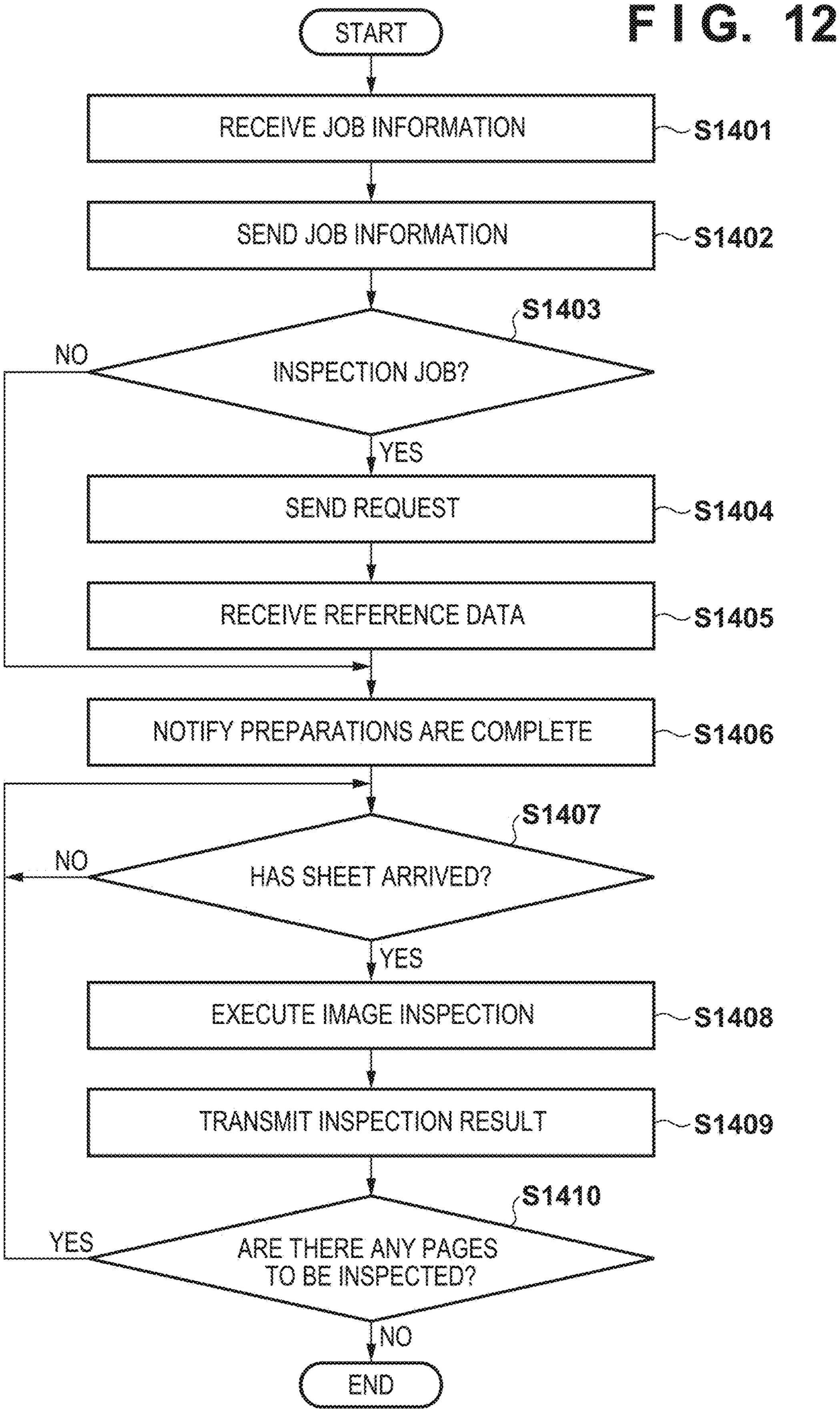
FIG. 12 is a flowchart illustrating a method for executing a job in the control apparatus.

FIG. 12 is a flowchart illustrating inspection processing executed by the CPU 301 of the inspection apparatus 50.

In S1401, the CPU 301 receives the job information from the control apparatus 40. The job information may be stored in the memory 310.

Alternatively, the job information may be stored in the memory 310 as part of the settings data 212.

In S1402, the CPU 301 sends the job information to the downstream stacking apparatus 60*a*.

In S1403, the CPU 301 analyzes the job information and determines whether the job information instructs an inspection job to be executed. If no inspection job is instructed, the inspection apparatus 50 executes a conveyance job for conveying the sheet P to the downstream stacking apparatus 60*a*. If an inspection job is instructed, the CPU 301 moves the sequence to S1404. If no inspection job is instructed, the CPU 301 moves the sequence to S1406.

In S1404, the CPU 301 sends, to the control apparatus 40, a request for the reference data 211.

In S1405, the CPU 301 receives the reference data 211 from the control apparatus 40. The reference data 211 is stored in the memory 310.

In S1406, the CPU 301 notifies the control apparatus 40 that preparations are complete. The notification that preparations are complete may also be sent to the downstream stacking apparatuses 60*a* to 60*c*.

In S1407, the CPU 301 determines whether a sheet P has arrived based on a detection signal output from the sheet sensor 56. A "sheet P arriving" means that the sheet sensor 56 has detected the leading end of the sheet P. When a sheet P arrives at the sheet sensor 56, the CPU 301 moves the sequence to S1408.

In S1408, the CPU 301 (the reading control unit 307 and the inspection unit 302) executes the image inspection designated by the job information. The reading control unit 307 reads the sheet P using the image sensors 54 and 55, and generates the inspection image data 312. Furthermore, the inspection unit 302 inspects the inspection image data 312 in accordance with the inspection settings designated by the job information. For example, the inspection unit 302 compares the inspection image data 312 with the reference data 211 and determines whether the image formed on the sheet P satisfies the passing criteria.

In S1409, the CPU 301 (the inspection unit 302) transmits the inspection result to the control apparatus 40 and the stacking apparatuses 60*a* to 60*c*. Note that if the job information designates the stacking apparatus 60*b* as the discharge destination, the inspection result is sent to at least the stacking apparatus 60*b*. This is because the discharge destination is switched based on the inspection result.

In S1410, the CPU 201 determines whether there are any pages to be inspected, designated by the job information. If there is a page remaining to be inspected, the CPU 301 moves the sequence to S1407 and waits for the next sheet P to arrive. If no pages remain to be inspected, the CPU 301 ends the job.

Figure 13:
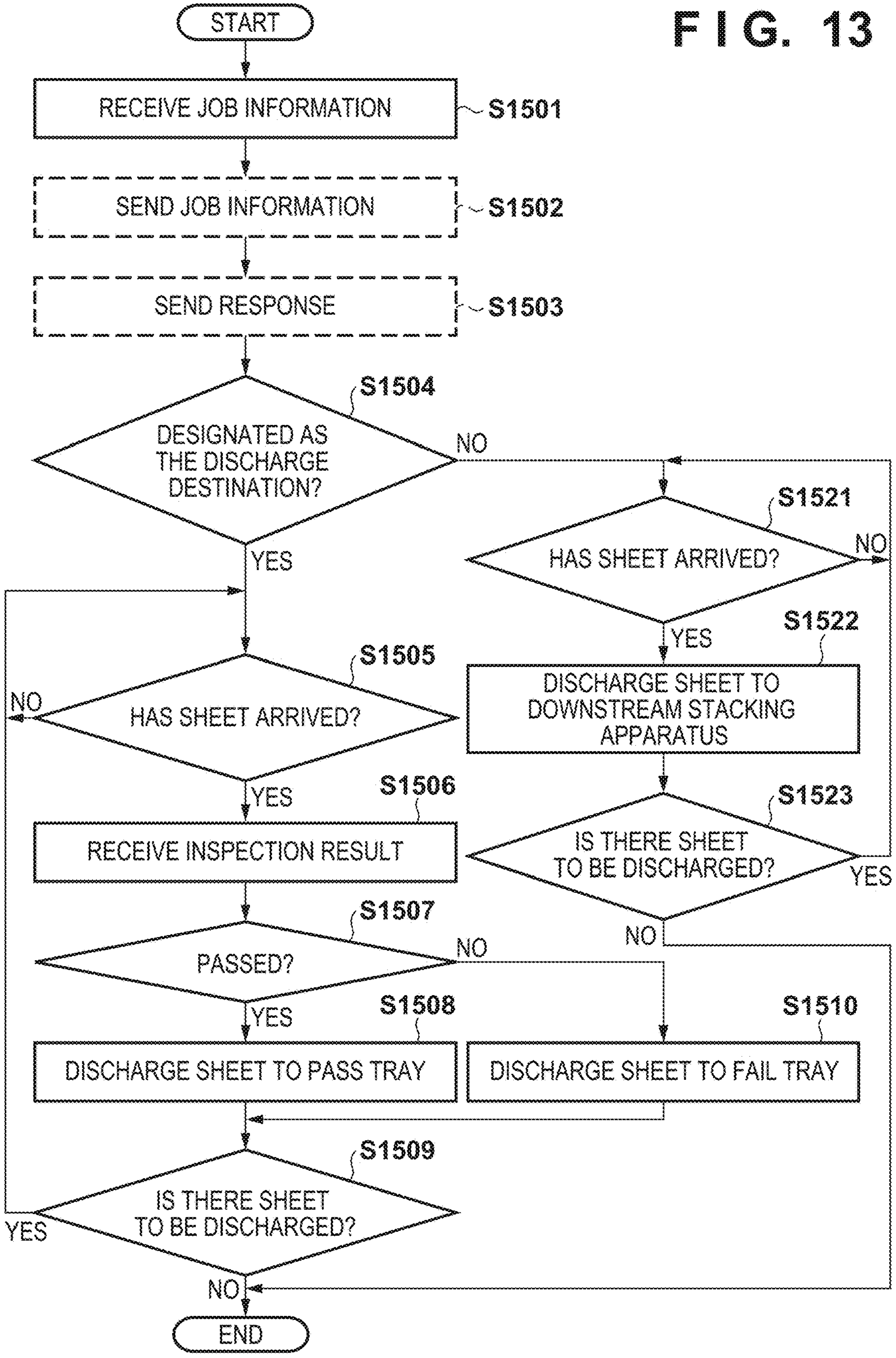
FIG. 13 is a flowchart illustrating a method for executing a job in a stacking apparatus.

FIG. 13 is a flowchart illustrating conveyance and discharge processing executed by the CPU 401 of the stacking apparatuses 60.

In S1501, the CPU 401 (the job control unit 402) receives the job information from the inspection apparatus 50 or the stacking apparatus 60 on the upstream side. Note that if a stacking apparatus 60 is present on the downstream side, the CPU 401 moves the sequence to S1502.

In S1502, the CPU 401 (the job control unit 402) sends the job information to the stacking apparatus 60 on the downstream side. Note that if the stacking apparatus 60 is the stacking apparatus 60 furthest on the downstream side, in S1503, a response indicating that the job information has been successfully received is sent to the inspection apparatus 50 or the stacking apparatus 60 on the upstream side. The stacking apparatus 60 on the upstream side forwards the response to the inspection apparatus 50.

In S1504, the CPU 401 determines whether it itself (i.e., the stacking apparatus 60) is designated as the discharge destination based on the job information. If the sheet P will pass through the stacking apparatus 60 itself and be discharged to a downstream stacking apparatus 60, the CPU 401 moves the sequence to S1521.

In S1521, the CPU 401 determines whether the sheet P has arrived based on the detection signal from the sheet sensor 66. When the sheet P arrives, the CPU 401 moves the sequence to S1522.

In S1522, the CPU 401 controls the motor M1 and the solenoids SL1 and SL2 to discharge the sheet P to the downstream stacking apparatus 60.

In S1523, the CPU 401 determines whether there is a sheet P to be discharged based on the job information. If there is a sheet P remaining to be discharged, the CPU 401 moves the sequence to S1521. If there is no sheet P remaining to be discharged, the CPU 401 completes the conveyance job.

On the other hand, if the stacking apparatus 60 itself is designated as the discharge destination, the CPU 401 moves the sequence from S1504 to S1505.

In S1505, the CPU 401 determines whether the sheet P has arrived based on the detection signal from the sheet sensor 66. When the sheet P arrives, the CPU 401 moves the sequence to S1506.

In S1506, the CPU 401 receives the inspection result from the inspection apparatus 50.

In S1507, the CPU 401 determines whether the sheet P has passed the inspection based on the inspection result. If the sheet P has passed the inspection, the CPU 401 moves the sequence to S1508.

In S1508, the CPU 401 controls the motor M1 and the solenoids SL1 and SL2, and discharges the sheet P to the pass tray. If the sheet P has not passed the inspection, the CPU 401 moves the sequence to S1510. In S1510, the CPU 401 controls the motor M1 and the solenoids SL1 and SL2, and discharges the sheet P to the fail tray. The pass tray and the fail tray are designated in advance by the job information.

In S1509, the CPU 401 determines whether there is a sheet P to be discharged based on the job information. If there is a sheet P remaining to be discharged, the CPU 401 moves the sequence to S1505. If there is no sheet P remaining to be discharged, the CPU 401 completes the discharge job.

As described above, according to the present embodiment, when an image on a long sheet is inspected, the inspected long sheet is not discharged to the stacking unit corresponding to the initial branch path among the plurality of branch paths (the stacking unit, among the plurality of stacking units, for which the conveyance path from the reading position is the shortest) (that is, the discharge is not permitted). The inspected long sheet is discharged to the stacking unit corresponding to the branch path that branches from the main path at the branch position located further downstream in the conveyance direction than the branch position that corresponds to the initial branch path. Specifically, if the length L in the conveyance direction of the long sheet to be inspected is longer than the conveyance distance D, the long sheet is not discharged to the stacking unit corresponding to the conveyance distance D. The long sheet is discharged to the stacking unit located further downstream in the conveyance direction than the stacking unit corresponding to the conveyance distance D. More specifically, if, for example, the purge operation is on and image on long sheets are to be inspected, the inspected long sheets which pass (OK) are discharged to a first stacking unit corresponding to the branch path that branches from the main path at the branch position further downstream than the branch position corresponding to the initial branch path. The inspected long sheets which fail (no go) are discharged to a second stacking unit corresponding to the branch path that branches from the main path at the branch position further downstream than the branch position corresponding to the initial branch path. As a result, long sheets inspected by the inspection apparatus 50 can be sorted and discharged according to the inspection results. Note that if the purge operation is off and images on long sheets are to be inspected, the inspected long sheets which pass (OK) and the inspected long sheets which fail (no go) are discharged to the stacking unit corresponding to the branch path that branches from the main path at the branch position further downstream than the branch position corresponding to the initial branch path.

Additionally, in the present embodiment, a stacking tray for which the conveyance distance D is longer than the length L of the sheet can be selected by the user, whereas a stacking tray for which the conveyance distance D is shorter than the length L of the sheet cannot be selected by the user. As a result, an image forming system which assists the user in making an appropriate selection (in which an appropriate selection can be made) is provided. The user will therefore be able to appropriately select the discharge destination of printing media that do not satisfy passing criteria.

In the present embodiment, if an inspection is not performed by the inspection apparatus 50, the user can select all of the stacking trays displayed in the screen SC3*a* illustrated in FIG. 8A as discharge destinations. In other words, if an inspection is not performed by the inspection apparatus 50, the long sheet may be discharged to a stacking unit, among the plurality of stacking units, for which the conveyance path from the reading position is the shortest.

Although a stacking unit that does not satisfy the discharge possible condition cannot be selected by the user in the present embodiment, the configuration is not limited thereto. For example, in the UI unit 1010, the user may be capable of selecting a stacking unit that does not satisfy the discharge possible condition. For example, the UI unit 1010 may gray out the job start (print start) button so that the user cannot press the job start (print start) button. The UI unit 1010 may also make a notification indicating that the selected stacking unit cannot be discharged to when the job start (print start) button is pressed. Additionally, the UI unit 1010 may hide stacking units that do not satisfy the discharge possible condition.

Although the present embodiment describes the CPU 301 as obtaining the information on the sheet size (the length of the sheet in the conveyance direction) input by the user, the configuration is not limited thereto. For example, the CPU 301 may obtain the information on the sheet size (the length of the sheet in the conveyance direction) based on a detection result from the sensor that is provided in the conveyance path along which the sheets is conveyed and that detects the presence or absence of sheets. The CPU 301 may also obtain the information on the sheet size (the length of the sheet in the conveyance direction) based on the read image.

Second Embodiment

Descriptions of parts of the configuration of the image forming system that are the same as in the first embodiment will be omitted.

When an inspection is performed, the inspection time may increase when the surface area of the priority inspection area is greater. In this case, the sheet P will reach the flapper F2*a* before the inspection result for the sheet P is known. It is necessary for the inspection result to be known before the leading end of the printed product reaches the branch point. Accordingly, in the present embodiment, the control is performed taking into account the inspection time.

Figure 14:
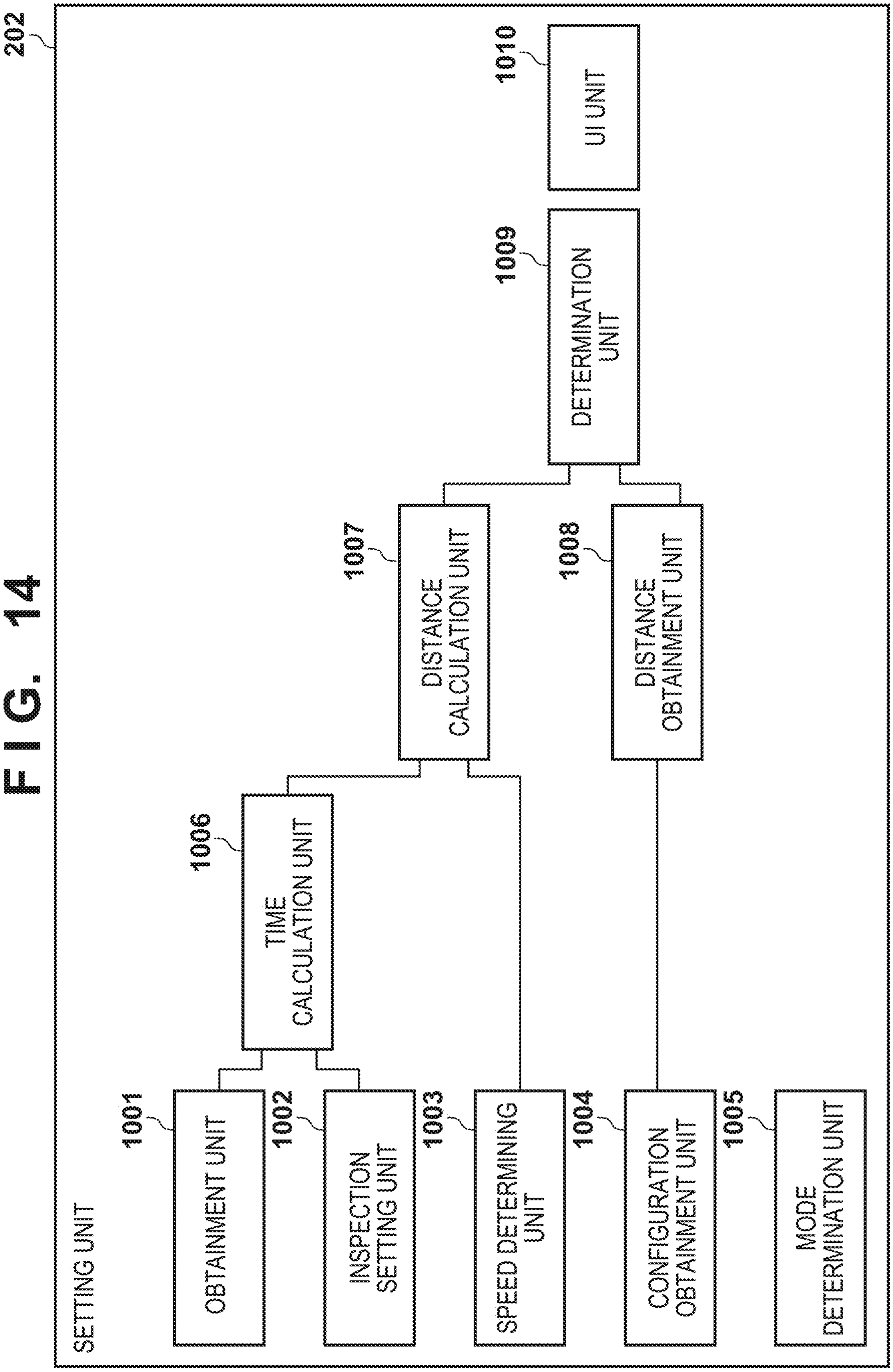
FIG. 14 is a diagram illustrating functions of a setting unit.

FIG. 14 illustrates the functions of the setting unit 202 of the CPU 201. The setting unit 202 according to the present embodiment has the following configurations, in addition to those of the setting unit 202 according to the first embodiment.

A speed determination unit 1003 determines a conveyance speed of the sheet P based on the size or basis weight of the sheet P obtained by the sheet obtainment unit 1001. For example, the conveyance speed of a sheet P having a higher basis weight is slower than the conveyance speed of a sheet P having a lower basis weight. This is to ensure good fixing properties for the toner. Likewise, a sheet P having a larger size requires more heat for the fixing than a sheet P having a smaller size. The conveyance speed of a sheet P having a larger size is therefore slower than the conveyance speed of a sheet P having a smaller size. Here, a conveyance speed S is determined for the inspection apparatus 50 and the stacking apparatuses 60*a* to 60*c*.

A time calculation unit 1006 calculates an inspection time T required by the inspection apparatus 50 to inspect a single sheet P based on the size of the sheet P and the inspection content. The inspection time T is highly correlated with the surface area of the inspection area. Accordingly, the CPU 201 calculates a total surface area of the inspection areas 705*a* and 705*b* set for each sheet P. The CPU 201 compares the total surface areas of all the sheets P and determines a maximum total surface area. The CPU 201 furthermore calculates the inspection time T from the maximum total surface area. The control program 213 holds a formula or table for calculating the inspection time T from the total surface area. The CPU 201 therefore calculates the inspection time T from the total surface area based on the formula or table. Note that instead of calculating the total surface area of the inspection areas 705*a* and 705*b*, the CPU 201 may obtain the surface area of the sheet P from the size of the sheet P based on a formula or table, and then calculate the inspection time T from the surface area of the sheet P.

A distance calculation unit 1007 calculates the conveyance distance of the sheet P (called a "calculated distance") based on the inspection time T and the conveyance speed S. The calculated distance is the product of T and S, for example.

The distance obtainment unit 1008 obtains the conveyance distances from the inlets 64 to the flappers F1 and F2, included in the configuration information 214 obtained by the configuration obtainment unit 1004. The distance obtainment unit 1008 also obtains the conveyance distance from the image sensor 55 (the reading position) in the inspection apparatus 50 to an outlet (the inlet 64*a* of the stacking apparatus 60*a*) from the configuration information 214. Finally, the distance obtainment unit 1008 obtains a distance D from the image sensor 55 (the reading position) to each branch point. Note that when an index i is added to each branch point as identification information, the distance D for each branch point i can be denoted as "Di". In addition, each branch point i is associated with one of the sheet trays 61, 62, and 69. The determination unit 1009 determines a discharge destination candidate for the printed product based on the conveyance distance from the image sensor 54 to each branch point and the calculated distance.

$$(S\times T) =< D - L \qquad \text{Eq. 1}$$

Eq. 1 may be rewritten as follows.

$$(S\times T) + L =< D \qquad \text{Eq. 2}$$

Here, L represents the length of the sheet P in the conveyance direction. The discharge destination connected to the branch point where Eq. 1 is satisfied is a discharge destination that can accept the sheet P in light of the inspection result. The determination unit 1009 determines whether sheets can be discharged to the sheet trays 62*a*, 61*b*, 62*b*, and 69.

As described above, in the present embodiment, the stacking tray to which a long sheet can be discharged is determined based on the length L of the long sheet in the conveyance direction, the conveyance distance D, and the distance over which the long sheet is conveyed during the inspection (S×T). As a result, long sheets inspected by the inspection apparatus 50 can be sorted and discharged according to the inspection results. Additionally, an image forming system which assists the user in making an appropriate selection (in which an appropriate selection can be made) is provided. The user will therefore be able to appropriately select the discharge destination of printing media that do not satisfy passing criteria.

Although the present embodiment describes calculating the conveyance speed S and the inspection time T for each sheet P, this is merely one example. To make the determination easier, the conveyance speed S and the inspection time T may be fixed values stored in the memory 210.

Additionally, the inspection settings screen SC2 may be configured such that the inspection items can be set, and the distance over which the long sheet is conveyed during the inspection may be calculated based on the inspection items.

<Technical Spirit Derived from Embodiments>

[Aspect 1]

The image forming apparatus 30 functions as a printing unit that prints an image onto a printing medium based on image data. The image sensors 54 and 55 function as a reading unit that generates the inspection image data 312 by reading the printing medium. The CPU 301 and the inspection unit 302 inspect whether the printing medium satisfies a predetermined image quality standard based on the inspection image data. The predetermined image quality standard may be set by the user through the inspection settings screen SC2, for example. The sheet trays 62*a*, 61*b*, 62*b*, 61*c*, 62*c*, and 69 are examples of a plurality of discharge units that discharge the printing medium. Note that from the perspective of the stacking apparatus 60*a*, the stacking apparatus 60*b* is also an example of a discharge unit. Likewise, from the perspective of the stacking apparatus 60*b*, the stacking apparatus 60*c* is also an example of a discharge unit. The solenoids SL1 and SL2 and the flappers F1 and F2 are examples of a guidance unit that guides the printing medium to the corresponding discharge unit among the plurality of discharge units based on the inspection result of the image from the inspection unit. As illustrated in FIGS. 8A and 8B, the display device 21 is an example of a display unit that displays a plurality of discharge destination candidates, among the plurality of discharge units, to which a printing medium that does not satisfy the image quality standard can be discharged. The input device 22 is an example of an accepting unit that accepts a designation of a single discharge unit from among the plurality of discharge destination candidates displayed in the display unit. The CPUs 201, 301, and 401 are examples of a control unit that controls the guidance unit to guide a printing medium that does not meet the image quality standard to the single discharge unit designated through the accepting unit. As described with reference to Eq. 1, a condition is set for the discharge unit candidates, among the plurality of discharge units, which can be selected by the user. Each of the plurality of discharge destination candidates is a discharge unit for which the quality inspection of the printing medium can be completed by the inspection unit before the printing medium arrives at a guidance unit present in the conveyance path extending from the reading unit to the corresponding discharge unit. For example, an inappropriate discharge unit cannot be a discharge unit candidate, and the user will therefore not be able to select the inappropriate discharge unit. Accordingly, the image inspection system 100 is provided, which assists the user in selecting the discharge destination for the printing medium inspected by the inspection apparatus 50.

[Aspect 2]

A first conveyance distance (e.g., S×T) is obtained based on the inspection time T required for the inspection unit to execute the quality inspection on the printing medium and the conveyance speed S of the printing medium. The CPU 201 and the determination unit 1009 function as a determination unit that determines a plurality of discharge destination candidates from the plurality of discharge units based on the first conveyance distance and a second conveyance distance (e.g., D) of the printing medium from the reading unit to the guidance unit.

[Aspect 3]

As indicated by Eq. 2, the CPU 201 and the determination unit 1009 may find the sum of the length L in the conveyance direction of the printing medium and the first conveyance distance. The CPU 201 and the determination unit 1009 may determine the plurality of discharge destination candidates from the plurality of discharge units based on whether the sum is less than the second conveyance distance. If the sheet P is a long sheet (e.g., L=30 inches), the sheet P will take longer to pass the image sensor 54. The image inspection cannot be executed until the following end of the sheet P passes the image sensor 54. Accordingly, by determining the plurality of discharge destination candidates in light of the length of the sheet P, the user will be able to select a more appropriate discharge unit.

[Aspect 4]

The discharge mode in which the purge operation is on is an example of a first mode in which the discharge unit to serve as the discharge destination of the printing medium is determined in accordance with the inspection result for the printing medium. The discharge mode in which the purge operation is off is an example of a second mode in which the discharge unit to serve as the discharge destination of the printing medium is determined regardless of the inspection result for the printing medium. As described with respect to the inspection operation settings screen SC3, the display device 21 displays a plurality of discharge destination candidates when the first mode is selected. The input device 22 may accept a designation of a single discharge unit from among the plurality of discharge destination candidates displayed in the display device 21.

[Aspect 5]

As illustrated in FIG. 8A and the like, the accepting unit may be further configured to accept a selection of either the first mode or the second mode. There are situations where there is no discharge unit for which the quality inspection of the printing medium can be completed by the inspection unit by the time the printing medium reaches the guidance unit. In this case, the display device 21 does not display the plurality of discharge destination candidates, and the input device 22 does not accept the selection of the first mode. This makes it possible for the user to review the inspection settings and the like to increase the number of discharge unit candidates.

[Aspect 6]

There are situations where the input device 22 accepts the selection of the second mode. There are also situations where there is no discharge unit for which the quality inspection of the printing medium can be completed by the inspection unit by the time the printing medium reaches the guidance unit, and the second mode is therefore forced to be selected. In this case, the display device 21 may display the plurality of discharge units as candidates for the discharge destination to which the printing medium is to be discharged, regardless of the inspection result of the printing medium. In this manner, when the purge operation is off, more discharge destination candidates are displayed to the user.

[Aspect 7]

The display device 21 may display all of the plurality of discharge units as candidates for the discharge destination to which the printing medium is to be discharged, regardless of the inspection result of the printing medium. In this manner, when the purge operation is set to be off, all the discharge units may be displayed as selection candidates.

[Aspect 8]

The setting unit 202 functions as a setting unit that sets the content of the quality inspection. As described with reference to FIG. 7, the inspection time T depends on the inspection content and the inspection level (inspection accuracy). Accordingly, the CPU 201 and the determination unit 1009 may obtain the inspection time in accordance with the content of the quality inspection set by the setting unit 202.

[Aspect 9]

The CPU 201 and the determination unit 1009 may determine a plurality of discharge destination candidates from among the plurality of discharge units based on the conveyance time of the printing medium from the reading unit to the guidance unit and the inspection time required for the inspection unit to execute the quality inspection on the printing medium. In this manner, the discharge unit candidates may be determined without converting the time to a distance. However, it is necessary to convert the Eq. 1 or Eq. 2 from an inequality related to distance to an inequality related to time. For example, Eq. 1 can be converted to Eq. 3.

$$T =< (D - L)/S \quad \text{Eq. 3}$$

[Aspect 10]

As indicated by Eq. 3, the CPU 201 and the determination unit 1009 may further narrow down the plurality of discharge destination candidates based on the size of the printing medium.

[Aspect 11]

There are situations where there is no discharge unit capable of discharging a printing medium that does not meet the image quality standard. In this case, the display device 21 may display a message or a screen suggesting the operator review the inspection settings or the inspection operation settings applied to the inspection unit.

[Aspect 12]

The inspection apparatus 50 generates the inspection image data by reading the printing medium, and executes the quality inspection for the image printed on the printing medium based on the image data and the inspection image data. The stacking apparatuses 60*a* to 60*c* are examples of discharge apparatuses to which the printing medium is discharged. The display device 21 is an example of a display device that displays information. The input device 22 is an example of an input device that accepts the input of instructions. The control apparatus 40 and the CPUs 201, 301, and 401 are an example of a control apparatus that controls the discharge apparatuses.

The inlet 64 is an example of an inlet that accepts the printing medium. The conveyance path P1 is an example of a first conveyance path extending from the inlet. The conveyance paths P2 and P3 are examples of a second conveyance path and a third conveyance path that branch from the first conveyance path. The conveyance paths P4 and P5 are examples of a fourth conveyance path and a fifth conveyance path that branch from the third conveyance path. The flapper F1 is an example of a first guidance unit that guides the printing medium, which has been conveyed along the first conveyance path, to the second conveyance path or the third conveyance path. The flapper F2 is an example of a second guidance unit that guides the printing medium, which has been conveyed along the third conveyance path, to the fourth conveyance path or the fifth conveyance path. The sheet tray 61 is an example of a first discharge unit to which the printing medium which has been conveyed along the second conveyance path is discharged. The sheet tray 62 is an example of a second discharge unit to which the printing medium which has been conveyed along the fourth conveyance path is discharged. The outlet 65, the downstream stacking apparatus 60, or the sheet trays 61, 62, and 69 of the downstream stacking apparatus 60 are examples of a third discharge unit to which the printing medium which has been conveyed along the fifth conveyance path is discharged. The display device 21 may display a discharge unit, among the first discharge unit, the second discharge unit, and the third discharge unit, to which the printing medium that does not meet the predetermined image quality standard can be discharged, as a discharge destination candidate. The input device 22 may accept a designation of a single discharge destination from among the plurality of discharge destination candidates displayed in the display device. The control apparatus 40 and the CPU 401 may control the first guidance unit and the second guidance unit to guide the printing medium that does not satisfy the predetermined image quality standard to the single discharge destination designated through the input device. This control may be implemented using the job information, for example. There are situations where the quality inspection of the printing medium can be completed by the inspection apparatus by the time the printing medium reaches the first guidance unit. In this case, the first discharge unit, the second discharge unit, and the third discharge unit may be displayed in the display device 21 as candidates for the plurality of discharge destinations. There are situations where the quality inspection for the printing medium cannot be completed by the inspection apparatus by the time the printing medium reaches the first guidance unit, but the quality inspection for the printing medium can be completed by the inspection apparatus by the time the printing medium reaches the second guidance unit. In this case, the second discharge unit and the third discharge unit are displayed in the display device as candidates for the plurality of discharge destinations.

[Aspect 13]

The stacking apparatus 60*a* (or the stacking apparatus 60*b*) is an example of a first discharge apparatus to which the printing medium is discharged. The stacking apparatus 60*b* (or the stacking apparatus 60*c*) is an example of a second discharge apparatus, connected downstream of the first discharge apparatus, to which the printing medium is discharged. The control apparatus 40 and the CPUs 201, 301, and 401 are an example of a control apparatus that controls the first discharge apparatus and the second discharge apparatus.

[Item 1]

An image forming system characterized by including:

an image forming apparatus that forms an image on a sheet;

a reading apparatus that reads the image on the sheet conveyed from the image forming apparatus;

an inspection unit that inspects the image on the sheet based on a result of the reading apparatus reading the image on the sheet;

a conveyance path including a main path that guides the sheet read by the reading apparatus and a plurality of branch paths that branch from the main path and guide the sheet; and a plurality of stacking units on which discharged sheets are stacked, wherein each of the plurality of branch paths branches from the main path at a branch position corresponding to the branch path, each of the plurality of stacking units corresponds to a different branch path among the plurality of branch paths, each of the plurality of branch paths guides the sheet toward a stacking unit corresponding to the branch path, when a length, in a lengthwise direction, of the sheet to be inspected by the inspection unit is longer than a length of a conveyance path between a branch position corresponding to an initial branch path in the plurality of branch paths and a reading position of the reading apparatus, the sheet inspected by the inspection unit is not discharged to a stacking unit corresponding to the initial branch path, and is discharged to a stacking unit corresponding to a branch path branching from the main path at a branch position located further downstream than the branch position corresponding to the initial branch path, and the branch position corresponding to the initial branch path is a branch position, among the branch positions corresponding respectively to the plurality of branch paths, for which a length of a conveyance path from the reading position is shortest.

[Item 2]

The image forming system according to Item 1, characterized in that when a length, in the lengthwise direction, of the sheet to be inspected by the inspection unit is longer than the length of the conveyance path between the branch position corresponding to the initial branch path and the reading position, the sheet that satisfies an inspection standard is discharged to a stacking unit corresponding to a first branch path branching from the main path at a first branch position located further downstream than the branch position corresponding to the initial branch path, and the sheet that does not satisfy the inspection standard is discharged to a stacking unit corresponding to a second branch path branching from the main path at a second branch position located further downstream than the branch position corresponding to the initial branch path.

[Item 3]

The image forming system according to Item 1 or 2, characterized by further including:

a obtaining unit for obtaining information related to the length of the sheet in the lengthwise direction, the information being input by a user; and a control unit for causing a sheet inspected by the inspection unit not to be discharged to the stacking unit corresponding to the initial branch path, when the information obtained indicates that the length of the sheet in the lengthwise direction is longer than the length of the conveyance path from the reading position to the branch position corresponding to the initial branch path.

[Item 4]

The image forming system according to any one of Items 1 to 3, characterized by further including:

a determining unit for determining the length of the sheet in the lengthwise direction based on image data obtained from reading performed by the reading apparatus; and a control unit for causing a sheet inspected by the inspection unit not to be discharged to the stacking unit corresponding to the initial branch path, when the determined length of the sheet in the lengthwise direction is longer than the length of the conveyance path from the reading position to the branch position corresponding to the initial branch path.

[Item 5]

The image forming system according to any one of Items 1 to 4, characterized by further including:

a sensor, provided in the conveyance path, that detects a presence or absence of the sheet;

an obtaining unit for obtaining information related to a length of the sheet in a conveyance direction, based on a detection result from the sensor; and a control unit for causing a sheet inspected by the inspection unit not to be discharged to the stacking unit corresponding to the initial branch path, when the information obtained indicates that the length of the sheet in the lengthwise direction is longer than the length of the conveyance path from the reading position to the branch position corresponding to the initial branch path.

[Item 6]

An image forming system characterized by including:

an image forming apparatus that forms an image on a sheet;

a reading apparatus that reads the image on the sheet at a reading position, the sheet being conveyed from the image forming apparatus;

an inspection unit that inspects the image on the sheet based on a result of the reading apparatus reading the image on the sheet;

a conveyance path including a main path that guides the sheet read by the reading apparatus and a plurality of branch paths that branch from the main path and guide the sheet;

a plurality of stacking units on which discharged sheets are stacked; and an obtaining unit for obtaining information related to a length of the sheet in a lengthwise direction of the sheet, wherein each of the plurality of branch paths branches from the main path at a branch position corresponding to the branch path, each of the plurality of stacking units corresponds to a different branch path among the plurality of branch paths, each of the plurality of branch paths guides the sheet toward a stacking unit corresponding to the branch path, the image forming system further comprises control unit for, when a total value of a value representing the obtained length of the sheet in the lengthwise direction and a value representing a distance the sheet is conveyed during inspection by the inspection unit is greater than a value representing a length of a conveyance path between a first branch position corresponding to a first branch path included in the plurality of branch paths and the reading position, causing the inspected sheet not to be discharged to a stacking unit corresponding to the first branch path, and causing the inspected sheet to be discharged to a stacking unit corresponding to a branch path that branches from the main path at a branch position located further downstream than the first branch position, and the first branch position is a branch position, among the branch positions corresponding respectively to the plurality of branch paths, for which a length of a conveyance path from the reading position is shortest.

[Item 7]

The image forming system according to Item 6, characterized by further including:

a display unit that displays a selection screen for selecting a region of an image on the sheet to be inspected by the inspection unit, wherein a distance over which the sheet is conveyed during inspection by the inspection unit is determined based on a size of a region of an image on the sheet to be inspected by the inspection unit.

[Item 8]

The image forming system according to Item 6 or 7, characterized by further including:

a display unit that displays a selection screen for selecting an inspection item used when the inspection unit inspects the image on the sheet, wherein a distance over which the sheet is conveyed during inspection by the inspection unit is determined based on the inspection item.

[Item 9]

The image forming system according to Item 6, characterized in that when the total value is longer than the length of the conveyance path between the first branch position and the reading position, the sheet that satisfies an inspection standard is discharged to a stacking unit corresponding to a second branch path that branches from the main path at a second branch position located further downstream than the first branch position, and the sheet that does not satisfy the inspection standard is discharged to a stacking unit corresponding to a third branch path that branches from the main path at a third branch position located further downstream than the first branch position.

[Item 10]

The image forming system according to any one of Items 6 to 9, characterized in that the obtaining unit obtains information related to the length of the sheet in the lengthwise direction, the information being input by a user.

[Item 11]

The image forming system according to any one of Items 6 to 10, characterized in that the obtaining unit obtains information related to the length of the sheet in the lengthwise direction based on image data obtained from reading performed by the reading apparatus.

[Item 12]

The image forming system according to any one of Items 6 to 11, characterized by further including:

a sensor, provided in the conveyance path, that detects a presence or absence of the sheet, wherein the obtaining unit obtains information related to a length of the sheet in a conveyance direction, based on a detection result from the sensor.

[Item 13]

An image forming system characterized by including:

an image forming apparatus that forms an image on a sheet;

a reading apparatus that reads the image on the sheet at a reading position, the sheet being conveyed from the image forming apparatus;

an inspection unit that inspects the image on the sheet based on a result of the reading apparatus reading the image on the sheet;

a conveyance path including a main path that guides the sheet read by the reading apparatus and a plurality of branch paths that branch from the main path and guide the sheet; and a plurality of stacking units on which discharged sheets are stacked, wherein each of the plurality of branch paths branches from the main path at a branch position corresponding to the branch path, each of the plurality of stacking units corresponds to a different branch path among the plurality of branch paths, each of the plurality of branch paths guides the sheet toward a stacking unit corresponding to the branch path, and the image forming system further comprises a display unit that displays a stacking unit to which a long sheet inspected by the inspection unit can be discharged, and a stacking unit to which the long sheet inspected by the inspection unit cannot be discharged, the long sheet being a sheet that is at least 1000 mm in a lengthwise direction of the sheet.

[Item 14]

The image forming system according to Item 13, characterized in that a length of a conveyance path between a branch position corresponding to the stacking unit to which the long sheet can be discharged and a reading position at which an image on the sheet is read is longer than a length of the conveyance path between a branch position corresponding to the stacking unit to which the long sheet cannot be discharged and the reading position.

[Item 15]

The image forming system according to Item 14, characterized in that the length of the conveyance path from the reading position to the branch position corresponding to the stacking tray to which the long sheet cannot be discharged is shorter than the length of the long sheet in the lengthwise direction.

[Item 16]

The image forming system according to any one of Items 13 to 15, characterized in that the display unit displays a selection screen for selecting a stacking unit to which the sheet is to be discharged from the plurality of stacking units, the display unit displays the stacking unit to which the long sheet inspected by the inspection unit can be discharged and the stacking unit to which the long sheet inspected by the inspection unit cannot be discharged on the selection screen, and the stacking unit to which the long sheet inspected by the inspection unit cannot be discharged is unselectable in the selection screen.

[Item 17]

The image forming system according to any one of Items 13 to 16, characterized in that the display unit displays a selection screen for selecting a stacking unit to which the sheet is to be discharged from the plurality of stacking units, the display unit displays the stacking unit to which the long sheet inspected by the inspection unit can be discharged in the selection screen, and the stacking unit to which the long sheet inspected by the inspection unit cannot be discharged is not displayed in the selection screen.

[Item 18]

The image forming system according to any one of Items 13 to 17, characterized in that the long sheet that satisfies an inspection standard is discharged to a first stacking unit corresponding to a branch path that corresponds to a branch position located further downstream than the branch position corresponding to the stacking unit to which the long sheet cannot be discharged, and the long sheet that does not satisfy the inspection standard is discharged to a second stacking unit corresponding to a branch path that corresponds to a branch position located further downstream than the branch position corresponding to the stacking unit to which the long sheet cannot be discharged.

[Item 19]

The image forming system according to any one of Items 13 to 18, characterized by further including:

an obtaining unit for obtaining information related to the length of the sheet in the lengthwise direction, the information being input by a user; and a control unit for causing the display unit to display the stacking unit to which the long sheet can be discharged and the stacking unit to which the long sheet cannot be discharged, based on the information obtained.

[Item 20]

The image forming system according to any one of Items 13 to 19, characterized by further including:

an obtaining unit for obtaining information related to the length of the sheet in the lengthwise direction based on image data obtained from reading performed by the reading apparatus; and a control unit for causing the display unit to display the stacking unit to which the long sheet can be discharged and the stacking unit to which the long sheet cannot be discharged, based on the information obtained.

[Item 21]

The image forming system according to any one of Items 13 to 20, characterized by further including:

a sensor, provided in the conveyance path, that detects a presence or absence of the sheet;

an obtaining unit for obtaining information related to a length of the sheet in the lengthwise direction, based on a detection result from the sensor; and a control unit for causing the display unit to display the stacking unit to which the long sheet can be discharged and the stacking unit to which the long sheet cannot be discharged, based on the information obtained.

[Item 22]

An image forming system characterized by including:

an image forming apparatus that forms an image on a sheet;

a reading apparatus that reads the image on the sheet at a reading position, the sheet being conveyed from the image forming apparatus;

an inspection unit that inspects the image on the sheet based on a result of the reading apparatus reading the image on the sheet;

a conveyance path including a main path that guides the sheet read by the reading apparatus and a plurality of branch paths that branch from the main path and guide the sheet; and a plurality of stacking units on which discharged sheets are stacked, wherein each of the plurality of branch paths branches from the main path at a branch position corresponding to the branch path, each of the plurality of stacking units corresponds to a specific different branch path among the plurality of branch paths, each of the plurality of branch paths guides the sheet toward a stacking unit corresponding to the branch path, and the image forming system includes a control unit for, when an image on a long sheet having a length of at least 1000 mm in the lengthwise direction of the sheet is inspected, not permitting the long sheet to be discharged to a stacking unit corresponding to a branch path that corresponds to a branch position, among branch positions corresponding to respective ones of the plurality of branch paths, for which a length of a conveyance path from the reading position is shortest.

[Item 23]

The image forming system according to Item 22, characterized in that the control unit permits a sheet inspected by the inspection unit and having a length shorter than 1000 mm in the lengthwise direction to be discharged to the stacking unit corresponding to the branch path that corresponds to the branch position for which the length of the conveyance path from the reading position is shortest.

[Item 24]

The image forming system according to Item 22 or 23, characterized in that the length of the conveyance path between the branch position for which the length of the conveyance path from the reading position is shortest and the reading position is shorter than the length of the long sheet in the lengthwise direction.

[Item 25]

The image forming system according to any one of Items 22 to 24, characterized in that the long sheet that satisfies the inspection standard is discharged to a first stacking unit corresponding to a branch path that corresponds to a branch position located further downstream than the branch position where the length of the conveyance path from the reading position is shorter than the branch position that is shortest, and the long sheet that does not satisfy the inspection standard is discharged to a second stacking unit corresponding to a branch path that corresponds to a branch position located further downstream than the branch position where the length of the conveyance path from the reading position is shortest.

[Item 26]

The image forming system according to any one of Items 22 to 25, characterized by further including:

an obtaining unit for obtaining information related to the length of the sheet in a conveyance direction of the sheet, the information being input by a user, wherein when the information obtained indicates that the length of the sheet in the lengthwise direction is longer than the length of the conveyance path from the reading position to the first branch position, the control unit does not permit the long sheet, inspected by the inspection unit, to be discharged to the stacking unit corresponding to the branch path that corresponds to the branch position for which the length of the conveyance path from the reading position is shortest.

[Item 27]

The image forming system according to any one of Items 22 to 26, characterized by further including:

a determining unit for determining the length of the sheet in a conveyance direction of the sheet based on image data obtained from reading performed by the reading apparatus, wherein when the determined length of the sheet in the lengthwise direction is longer than 1000 mm, the control unit does not permit the long sheet, inspected by the inspection unit, to be discharged to the stacking unit corresponding to the branch path that corresponds to the branch position for which the length of the conveyance path from the reading position is shortest.

[Item 28]

The image forming system according to any one of Items 22 to 27, characterized by further including:

a sensor, provided in the conveyance path, that detects a presence or absence of the sheet; and an obtaining unit for obtaining information related to a length of the sheet in a conveyance direction, based on a detection result from the sensor, wherein when the information obtained indicates that the length of the sheet in the lengthwise direction is longer than the length of the conveyance path from the reading position to the first branch position, the control unit does not permit the inspected long sheet to be discharged to the stacking unit corresponding to the branch path that corresponds to the branch position for which the length of the conveyance path from the reading position is shortest.

According to the present invention, an inspected sheet can be discharged appropriately.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image forming system comprising:

an image forming apparatus that forms an image on a sheet;

a reading apparatus that reads the image on the sheet conveyed from the image forming apparatus;

an inspection unit that inspects the image on the sheet based on a result of the reading apparatus reading the image on the sheet;

a conveyance path including a main path that guides the sheet read by the reading apparatus and a plurality of branch paths that branch from the main path and guide the sheet; and a plurality of stacking units on which discharged sheets are stacked, wherein each of the plurality of branch paths branches from the main path at a branch position corresponding to the branch path;

each of the plurality of stacking units corresponds to a different branch path among the plurality of branch paths, each of the plurality of branch paths guides the sheet toward a stacking unit corresponding to the branch path, when a length, in a lengthwise direction, of the sheet to be inspected by the inspection unit is longer than a length of a conveyance path between a branch position corresponding to an initial branch path in the plurality of branch paths and a reading position of the reading apparatus, the sheet inspected by the inspection unit is not discharged to a stacking unit corresponding to the initial branch path, and is discharged to a stacking unit corresponding to a branch path branching from the main path at a branch position located further downstream than the branch position corresponding to the initial branch path, and the branch position corresponding to the initial branch path is a branch position, among the branch positions corresponding respectively to the plurality of branch paths, for which a length of a conveyance path from the reading position is shortest.

2. The image forming system according to claim 1, wherein when a length, in the lengthwise direction, of the sheet to be inspected by the inspection unit is longer than the length of the conveyance path between the branch position corresponding to the initial branch path and the reading position, the sheet that satisfies an inspection standard is discharged to a stacking unit corresponding to a first branch path branching from the main path at a first branch position located further downstream than the branch position corresponding to the initial branch path, and the sheet that does not satisfy the inspection standard is discharged to a stacking unit corresponding to a second branch path branching from the main path at a second branch position located further downstream than the branch position corresponding to the initial branch path.

3. The image forming system according to claim 1, further comprising:

a controller configured to:

obtain information related to the length of the sheet in the lengthwise direction, the information being input by a user; and control a sheet inspected by the inspection unit not to be discharged to the stacking unit corresponding to the initial branch path, when the information obtained indicates that the length of the sheet in the lengthwise direction is longer than the length of the conveyance path from the reading position to the branch position corresponding to the initial branch path.

4. The image forming system according to claim 1, further comprising:

a controller configured to:

determine the length of the sheet in the lengthwise direction based on image data obtained from reading performed by the reading apparatus; and control a sheet inspected by the inspection unit not to be discharged to the stacking unit corresponding to the initial branch path, when the determined length of the sheet in the lengthwise direction is longer than the length of the conveyance path from the reading position to the branch position corresponding to the initial branch path.

5. The image forming system according to claim 1, further comprising:

a sensor, provided in the conveyance path, that detects a presence or absence of the sheet;

a controller configured to:

obtain information related to a length of the sheet in a conveyance direction, based on a detection result from the sensor; and control a sheet inspected by the inspection unit not to be discharged to the stacking unit corresponding to the initial branch path, when the information obtained indicates that the length of the sheet in the lengthwise direction is longer than the length of the conveyance path from the reading position to the branch position corresponding to the initial branch path.

6. An image forming system comprising:

an image forming apparatus that forms an image on a sheet;

a reading apparatus that reads the image on the sheet at a reading position, the sheet being conveyed from the image forming apparatus;

an inspection unit that inspects the image on the sheet based on a result of the reading apparatus reading the image on the sheet;

a conveyance path including a main path that guides the sheet read by the reading apparatus and a plurality of branch paths that branch from the main path and guide the sheet;

a plurality of stacking units on which discharged sheets are stacked; and a controller configured to obtain information related to a length of the sheet in a lengthwise direction of the sheet, wherein each of the plurality of branch paths branches from the main path at a branch position corresponding to the branch path, each of the plurality of stacking units corresponds to a different branch path among the plurality of branch paths, each of the plurality of branch paths guides the sheet toward a stacking unit corresponding to the branch path, the controller is further configured to, in a case where a total value of a value representing the obtained length of the sheet in the lengthwise direction and a value representing a distance the sheet is conveyed during inspection by the inspection unit is greater than a value representing a length of a conveyance path between a first branch position corresponding to a first branch path included in the plurality of branch paths and the reading position, control the inspected sheet not to be discharged to a stacking unit corresponding to the first branch path, and control the inspected sheet to be discharged to a stacking unit corresponding to a branch path that branches from the main path at a branch position located further downstream than the first branch position, and the first branch position is a branch position, among the branch positions corresponding respectively to the plurality of branch paths, for which a length of a conveyance path from the reading position is shortest.

7. The image forming system according to claim 6, further comprising:

a display unit that displays a selection screen for selecting a region of an image on the sheet to be inspected by the inspection unit, wherein a distance over which the sheet is conveyed during inspection by the inspection unit is determined based on a size of a region of an image on the sheet to be inspected by the inspection unit.

8. The image forming system according to claim 6, further comprising:

a display unit that displays a selection screen for selecting an inspection item used when the inspection unit inspects the image on the sheet, wherein a distance over which the sheet is conveyed during inspection by the inspection unit is determined based on the inspection item.

9. The image forming system according to claim 6, wherein in a case where the total value is longer than the length of the conveyance path between the first branch position and the reading position, the sheet that satisfies an inspection standard is discharged to a stacking unit corresponding to a second branch path that branches from the main path at a second branch position located further downstream than the first branch position, and the sheet that does not satisfy the inspection standard is discharged to a stacking unit corresponding to a third branch path that branches from the main path at a third branch position located further downstream than the first branch position.

10. The image forming system according to claim 6, wherein the controller obtains information related to the length of the sheet in the lengthwise direction, the information being input by a user.

11. The image forming system according to claim 6, wherein the controller obtains information related to the length of the sheet in the lengthwise direction based on image data obtained from reading performed by the reading apparatus.

12. The image forming system according to claim 6, further comprising:

a sensor, provided in the conveyance path, that detects a presence or absence of the sheet;

wherein the controller obtains information related to a length of the sheet in a conveyance direction, based on a detection result from the sensor.

13. An image forming system comprising:

an image forming apparatus that forms an image on a sheet;

a reading apparatus that reads the image on the sheet at a reading position, the sheet being conveyed from the image forming apparatus;

an inspection unit that inspects the image on the sheet based on a result of the reading apparatus reading the image on the sheet;

a conveyance path including a main path that guides the sheet read by the reading apparatus and a plurality of branch paths that branch from the main path and guide the sheet; and a plurality of stacking units on which discharged sheets are stacked, wherein each of the plurality of branch paths branches from the main path at a branch position corresponding to the branch path, each of the plurality of stacking units corresponds to a different branch path among the plurality of branch paths, each of the plurality of branch paths guides the sheet toward a stacking unit corresponding to the branch path, and the image forming system further comprises a display unit that displays a stacking unit to which a long sheet inspected by the inspection unit can be discharged, and a stacking unit to which the long sheet inspected by the inspection unit cannot be discharged, the long sheet being a sheet that is at least 1000 mm in a lengthwise direction of the sheet.

14. The image forming system according to claim 13, wherein a length of a conveyance path between a branch position corresponding to the stacking unit to which the long sheet can be discharged and a reading position at which an image on the sheet is read is longer than a length of the conveyance path between a branch position corresponding to the stacking unit to which the long sheet cannot be discharged and the reading position.

15. The image forming system according to claim 14, wherein the length of the conveyance path from the reading position to the branch position corresponding to a stacking tray to which the long sheet cannot be discharged is shorter than the length of the long sheet in the lengthwise direction.

16. The image forming system according to claim 13, wherein the display unit displays a selection screen for selecting a stacking unit to which the sheet is to be discharged from the plurality of stacking units, the display unit displays the stacking unit to which the long sheet inspected by the inspection unit can be discharged and the stacking unit to which the long sheet inspected by the inspection unit cannot be discharged on the selection screen, and the stacking unit to which the long sheet inspected by the inspection unit cannot be discharged is unselectable in the selection screen.

17. The image forming system according to claim 13, wherein the display unit displays a selection screen for selecting a stacking unit to which the sheet is to be discharged from the plurality of stacking units, the display unit displays the stacking unit to which the long sheet inspected by the inspection unit can be discharged in the selection screen, and the stacking unit to which the long sheet inspected by the inspection unit cannot be discharged is not displayed in the selection screen.

18. The image forming system according to claim 13, wherein the long sheet that satisfies an inspection standard is discharged to a first stacking unit corresponding to a branch path that corresponds to a branch position located further downstream than the branch position corresponding to the stacking unit to which the long sheet cannot be discharged, and the long sheet that does not satisfy the inspection standard is discharged to a second stacking unit corresponding to a branch path that corresponds to a branch position located further downstream than the branch position corresponding to the stacking unit to which the long sheet cannot be discharged.

19. The image forming system according to claim 13, further comprising:

a controller configured to:

obtain information related to the length of the sheet in the lengthwise direction, the information being input by a user; and control the display unit to display the stacking unit to which the long sheet can be discharged and the stacking unit to which the long sheet cannot be discharged, based on the information obtained.

20. The image forming system according to claim 13, further comprising:

a controller configured to:

obtain information related to the length of the sheet in the lengthwise direction based on image data obtained from reading performed by the reading apparatus; and control the display unit to display the stacking unit to which the long sheet can be discharged and the stacking unit to which the long sheet cannot be discharged, based on the information obtained.

21. The image forming system according to claim 13, further comprising:

a sensor, provided in the conveyance path, that detects a presence or absence of the sheet;

a controller configured to:

obtain information related to a length of the sheet in the lengthwise direction, based on a detection result from the sensor; and control the display unit to display the stacking unit to which the long sheet can be discharged and the stacking unit to which the long sheet cannot be discharged, based on the information obtained.

22. An image forming system comprising:

an image forming apparatus that forms an image on a sheet;

a reading apparatus that reads the image on the sheet at a reading position, the sheet being conveyed from the image forming apparatus;

an inspection unit that inspects the image on the sheet based on a result of the reading apparatus reading the image on the sheet;

a conveyance path including a main path that guides the sheet read by the reading apparatus and a plurality of branch paths that branch from the main path and guide the sheet; and a plurality of stacking units on which discharged sheets are stacked, wherein each of the plurality of branch paths branches from the main path at a branch position corresponding to the branch path, each of the plurality of stacking units corresponds to a specific different branch path among the plurality of branch paths, each of the plurality of branch paths guides the sheet toward a stacking unit corresponding to the branch path, and the image forming system includes a controller, in a case where an image on a long sheet having a length of at least 1000 mm in the lengthwise direction of the sheet is inspected, not permit the long sheet to be discharged to a stacking unit corresponding to a branch path that corresponds to a branch position, among branch positions corresponding to respective ones of the plurality of branch paths, for which a length of a conveyance path from the reading position is shortest.

23. The image forming system according to claim 22, wherein the controller permits a sheet inspected by the inspection unit and having a length shorter than 1000 mm in the lengthwise direction to be discharged to the stacking unit corresponding to the branch path that corresponds to the branch position for which the length of the conveyance path from the reading position is shortest.

24. The image forming system according to claim 22, wherein the length of the conveyance path between the branch position for which the length of the conveyance path from the reading position is shortest and the reading position is shorter than the length of the long sheet in the lengthwise direction.

25. The image forming system according to claim 22, wherein the long sheet that satisfies the inspection standard is discharged to a first stacking unit corresponding to a branch path that corresponds to a branch position located further downstream than the branch position where the length of the conveyance path from the reading position is shorter than the branch position that is shortest, and the long sheet that does not satisfy the inspection standard is discharged to a second stacking unit corresponding to a branch path that corresponds to a branch position located further downstream than the branch position where the length of the conveyance path from the reading position is shortest.

26. The image forming system according to claim 22, wherein the controller is further configured to obtain information related to the length of the sheet in a conveyance direction of the sheet, the information being input by a user;

wherein in a case where the information obtained indicates that the length of the sheet in the lengthwise direction is longer than the length of the conveyance path from the reading position to a first branch position, the controller does not permit the long sheet, inspected by the inspection unit, to be discharged to the stacking unit corresponding to the branch path that corresponds to the branch position for which the length of the conveyance path from the reading position is shortest.

27. The image forming system according to claim 22, wherein the controller is further configured to determine the length of the sheet in a conveyance direction of the sheet based on image data obtained from reading performed by the reading apparatus, wherein when the determined length of the sheet in the lengthwise direction is longer than 1000 mm, the controller does not permit the long sheet, inspected by the inspection unit, to be discharged to the stacking unit corresponding to the branch path that corresponds to the branch position for which the length of the conveyance path from the reading position is shortest.

28. The image forming system according to claim 22, further comprising a sensor, provided in the conveyance path, that detects a presence or absence of the sheet, and wherein the controller is further configured to obtain information related to a length of the sheet in a conveyance direction, based on a detection result from the sensor, wherein when the information obtained indicates that the length of the sheet in the lengthwise direction is longer than the length of the conveyance path from the reading position to the first branch position, the controller does not permit the inspected long sheet to be discharged to the stacking unit corresponding to the branch path that corresponds to the branch position for which the length of the conveyance path from the reading position is shortest.

* * * * *